US011695636B2

(12) United States Patent
Bongaarts et al.

(10) Patent No.: US 11,695,636 B2
(45) Date of Patent: Jul. 4, 2023

(54) LATENCY-SENSITIVE NETWORK-TRAFFIC QUALITY OF SERVICE

(71) Applicant: T-Mobile USA, Inc., Bellevue, WA (US)

(72) Inventors: Paul Bongaarts, Issaquah, WA (US); Mallika Deshpande, Sammamish, WA (US); Grant Morgan Castle, Bellevue, WA (US); Otto Fonseca Escudero, Snoqualmie, WA (US); Andrew Gapin, Seattle, WA (US); Egil Gronstad, Encinitas, CA (US); Kirti Krishnan, Sammamish, WA (US); Salvador Mendoza, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 25 days.

(21) Appl. No.: 17/316,341

(22) Filed: May 10, 2021

(65) Prior Publication Data
US 2021/0328872 A1 Oct. 21, 2021

Related U.S. Application Data

(63) Continuation of application No. 16/229,082, filed on Dec. 21, 2018, now Pat. No. 11,005,715.

(51) Int. Cl.
*G06F 15/173* (2006.01)
*H04L 41/0893* (2022.01)
(Continued)

(52) U.S. Cl.
CPC ...... *H04L 41/0893* (2013.01); *H04L 63/0227* (2013.01); *H04L 65/1016* (2013.01);
(Continued)

(58) Field of Classification Search
CPC ............. H04L 65/1016; H04L 65/1104; H04L 41/0893; H04M 15/66
(Continued)

(56) References Cited

U.S. PATENT DOCUMENTS

| 2009/0268754 A1* | 10/2009 | Palm | H04L 67/5651 |
| | | | 370/466 |
| 2010/0003928 A1* | 1/2010 | Tang | H04W 28/06 |
| | | | 455/72 |

(Continued)

FOREIGN PATENT DOCUMENTS

| CA | WO2008070957 A1 | 6/2008 |
| KR | 20180123345 A | 11/2018 |

OTHER PUBLICATIONS

The International Preliminary Report on Patentability dated Sep. 10, 2021, for PCT App No. PCT/US20/16342.
(Continued)

*Primary Examiner* — Lan Dai T Truong
(74) *Attorney, Agent, or Firm* — Lee & Hayes, P.C.

(57) ABSTRACT

A telecommunication system can include routing devices, a bearer-management device, and a policy-management device. The bearer-management device can receive a request from a terminal to create a specialized bearer (SB) for a non-audio, non-video media type. The bearer-management device can determine that the request is associated with an authorized user, and then send a setup message comprising a Quality of Service (QoS) indicator to the policy-management device. The policy-management device can create the SB permitting data exchange between the terminal and a routing device. The SB can have QoS characteristics associated with the QoS indicator. In some examples, the terminal can receive a network address, determine an associated network port, and send a SIP INVITE message
(Continued)

indicating the non-audio, non-video media type. The terminal can then exchange data on the network port with a peer network terminal.

20 Claims, 16 Drawing Sheets

(51) Int. Cl.
  *H04L 9/40*     (2022.01)
  *H04L 65/1016*   (2022.01)
  *H04M 15/00*    (2006.01)
  *H04L 65/80*     (2022.01)
  *H04L 65/1104*   (2022.01)

(52) U.S. Cl.
  CPC .......... *H04L 65/1104* (2022.05); *H04L 65/80* (2013.01); *H04M 15/66* (2013.01)

(58) Field of Classification Search
  USPC ................ 709/223, 225, 226, 227, 228, 229
  See application file for complete search history.

(56) References Cited

U.S. PATENT DOCUMENTS

| | | |
|---|---|---|
| 2011/0047282 A1 | 2/2011 | Denman et al. |
| 2013/0111043 A1* | 5/2013 | McGuire ............ H04L 61/2514 709/227 |
| 2014/0010229 A1* | 1/2014 | Nashimoto ......... H04L 65/1069 370/352 |
| 2015/0237144 A1 | 8/2015 | Miao et al. |
| 2016/0021336 A1* | 1/2016 | Abbott ................ H04L 65/1016 348/14.02 |
| 2016/0330108 A1* | 11/2016 | Gillon ................. H04L 12/2801 |
| 2016/0330646 A1 | 11/2016 | Hu et al. |
| 2017/0237790 A1* | 8/2017 | Patel ....................... H04L 65/65 709/203 |
| 2017/0303259 A1 | 10/2017 | Lee et al. |
| 2018/0199243 A1 | 7/2018 | Bharatia |
| 2018/0255594 A1 | 9/2018 | Liang et al. |
| 2018/0368038 A1 | 12/2018 | Reddiboyana et al. |
| 2019/0020607 A1 | 1/2019 | Chiang |
| 2019/0053328 A1 | 2/2019 | Kunz |
| 2019/0082417 A1 | 3/2019 | Bolle et al. |
| 2019/0124572 A1 | 4/2019 | Park et al. |
| 2019/0335392 A1 | 10/2019 | Qiao et al. |
| 2020/0204446 A1 | 6/2020 | Bongaarts et al. |
| 2020/0214054 A1 | 7/2020 | Qiao et al. |
| 2020/0236578 A1 | 7/2020 | Cakulev et al. |
| 2020/0260457 A1 | 8/2020 | Sun et al. |
| 2020/0280511 A1 | 9/2020 | Gapin et al. |
| 2020/0296221 A1 | 9/2020 | Zhou et al. |
| 2020/0305211 A1* | 9/2020 | Foti ....................... H04M 15/57 |
| 2020/0334179 A1* | 10/2020 | Agarwal ............. G06F 11/1004 |

OTHER PUBLICATIONS

3GPP, "3rd Generation Partnership Project; Technical Specification Group Services and System Aspects, Study on Architecture for the Next Generation System, (Release 14)," 3GPP TR 23.799 v14.0.0, Dec. 2016, pp. 21-24.

3GPP, "3rd Generation Partnership Project; Technical Specification Group Services and System Aspects, System Architecture for the 5G System, Stage 2 (Release 15)," 3GPP TS 23.501 v15.1.0, Mar. 2018, pp. 19-23,73-75, 5.6.9, 87-100, 180-196.

3GPP, "3rd Generation Partnership Project; Technical Specification Group Services and System Aspects, Procedures for the 5G System, Stage 2 (Release 15)," 3GPP TS 23.502 v15.4.0, Dec. 2018, , pp. 54-56, 80-87, 93-104, 213-219, 231, 235-236.

"3GPP; TSG CT; PCC signalling flows and QoS parameter mapping (Release 15)", 3GPP TS 29.213 V15.4.0, Sep. 21, 2018, sections 6-7, 230 pages.

3GPP, "3rd Generation Partnership Project; Technical Specification Group Radio Access Network, NG-RAN, NG Application Protocol (NGAP), (Release 15)," 3GPP TS 38.413 v1.0.0, Jun. 2018, pp. 18-22, 23-25, 29-30, 78-79, 112.

"AR, VR—Real-time Communications in 5G", Realtimecommunication.info, Sep. 14, 2018, 4 pages.

Burger, "A Session Initiation Protocol (SIP) Response Code for Rejected Calls", draft-ietf-sipcore-rejected-02, IETF, SIPCORE WG, Dec. 28, 2018, 22 pages.

Callegari, et al., "Experimental Analysis of ViLTE Service", IEEE Access, vol. 6, Feb. 23, 2018, 11 pages.

"Differentiated Services", Wikipedia, Jul. 16, 2018, retrieved Jul. 23, 2018 from «https://en.wikipedia.org/w/index.php?title=Differentiatied_services&oldid=850454519», 7 pages.

ETSI TS 123 060 V14.4.0, "Digital Cellular Telecommunications System (Phase 2+) (GSM); Universal Mobile Telecommunications System (UMTS); General Packet Radio Service (GPRS)", Jul. 2017, pp. 1, 279-282, 321-325, and 334-339.

ETSI TS 123 203 V14.5.0, "Digital Cellular elecommunications System (Phase 2+) (GSM); Universal Mobile Telecommunications System (UMTS); LTE; Policy and Charging Contrl Architecture", Oct. 2017, pp. 18, 28-30, 35-39, and 47-55.

ETSI TS 123 228 v15.3.0, "Digital Cellular Telecommunications system (Phase 2+) (GSM), Universal Mobile Telecommunications System (UMTS), LTE, IP Multimedia Subsystem (IMS), Stage 2", Sep. 2018, pp. 315-321.

ETSI TS 123 401 V14.4.0, "LTE; General Packet Radio Service (GPRS) Enhancements for Evolved Universal Terrestrial Radio Access Network (E-UTRAN) Access", Jul. 2017, pp. 89-95, 109-113.

ETSI TS 123 503 v15.3.0, "5G, Policy and Charging Control Framework for the 5G System, Stage 2", Sep. 2018, pp. 13-20.

ETSI TS 124 008 V13.5.0, "Digital Cellular Telecommunications System (Phae 2+) (GSM); Universal Mobile Telecommunications System (UMTS); LTE; Mobile Rado Interface Layer 3 Specification", Apr. 2016, pp. 296-309, 431-432, 621-627.

ETSI TS 124 229 V10.9.0, "Digital Cellular Telecommuniations Systems (Phase 2+); Universal Mobile Telecommunications System (UMTS)", Nov. 2012, pp. 1, 140-141, 265-266, 627-634.

ETSI TS 124 229 v15.4.0, "Digital Cellular Telecommunications system (Phase 2+) (GSM), Universal Mobile Telecommunications System (UMTS), LTE, 5G, IP Multimedia call control protocol based on Session Initiation Protocol (SIP) and Session Description Protocol (SDP), Stage 3", Nov. 2018,—pp. 177-197, 953-958.

ETSI TS 124 501 v15.1.0, "5G, Non-Access-Stratum (NAS) protocol for 5G System (5GS), Stage 3", Oct. 2018, pp. 182-188, 208-225, 274-276, 349-361.

ETSI TS 126 114 V15.3.0, "Universal MoPile Telecommunications Systems (UMTS); LTE; IP Multimedia Subsystem (IMS); Mulitmedia Telephony; Media Handling and Interaction", Jul. 2018, pp. 246-253.

ETSI TS 129 162 V14.2.0, "Digital Cellular Telecommunications System (Phase 2+) (GSM); Universal Mobile Telecommunications Systems (UMTS)", Apr. 2017, pp. 15-18.

ETSI TS 129 212 V15.3.0, "Universal Mobile Telecommunications System (UMTS); LTE; Policy and Charging control (PCC); Reference Points", Jul. 2018, pp. 38-39, 114-122, 136-139.

ETSI TS 129 212 V15.3.0, "Universal Mobile Telecommunications System (UMTS); LTE: Policy and Charging control (PCC); Reference Points", Jul. 2018, pp. 28-43, 122, 135-143, 185-189.

ETSI TS 129 213 V15.3.0, "Digital Cellular Telecommunications System (Phase 2+) (GSM); Universal Mobile Telecommunications System (UMTS); Policy and Charging Control Signaling Flows and Quality of Service (QoS) Parameter Mapping", Jul. 2018, pp. 14-22, 34-45, 93-119.

ETSI TS 129 214 V15.4.0, "Universal Mobile Telecommunications System (UMTS); LTE; Policy and Charging Control Over Rx Reference Point", Jul. 2018, p. 42.

ETSI TS 129 214 V15.4.0, "Universal Mobile Telecommunications System (UMTS); LTE; Plicy and Charging Control Over Rx Reference Point", Jul. 2018, pp. 13-18, 34-36, 39-50, 59-61, 64-84.

(56) References Cited

OTHER PUBLICATIONS

ETSI TS 129 512 v15.1.0, "5G, 5G System, Session Management Policy Control Service, Stage 3", Oct. 2018, pp. 10-18, 30-31, 39-50.
ETSI TS 129 513 v15,1.0, "5G, 5G System, Policy and Charging Control Signalling Flows and QoS Parameter Mapping, Stage 3", Oct. 2018, pp. 45-63.
ETSI TS 129 514 v15.1.0, "5G,5G System, Policy Authorization Service, Stage 3", Oct. 2018, pp. 54-55, 60, 62-63.
ETSI TS 138 331 v15.2.1, "5G, NR, Radio Resource Control (RRC), Protocol Specificiations", Jun. 2018, pp. 18-19, 32-33.
ETSI TS 138 413 v15.1.0, "5G, NR-RAN, NG Application Protocol (NGAP)", Sep. 2018, pp. 19-25, 112.
Houshmand, M., "Policy Control Over the Rx interface Using Diameter for VoLTE", Netmanias, Jan. 2, 2017, 8 pages.
"IMS-MGW and IMS-MGCF" Advantech, Apr. 26, 2012, retrieved May 22, 2015 from «http://www.advantech-embedded.com/networks-communications/telecom?doc_id=%7b3b222ed1-6165-41ca-bf52-a2a12171faf», 2 pages.
"Integrated Services", Wkipedia, May 28, 2018, retrieved Jul. 23, 2018 from «https://en.wikipedia.org/w/index.php?title=Integrated_services&oldid=843347119, 3 pages.
"Link Layer Discovery Protocol", Wikipedia, Nov. 1, 2017, retrieved Jul. 23, 2018 from «https://en.wikipedia.org/w/index.php?title=Link_LayerDiscovery_Protocol&oldid808179148», 4 pages.
Miracle, Rob., "Tutorial: Local Multiplayer with UDP/TCP", Corona Labs, Sep. 23, 2014, 13 pages.
Office Action for U.S. Appl. No. 16/408,675, dated Oct. 20, 2020, Gapin, "QOS for Latency-Sensitive Network-Traffic Flows", 17 Pages.
The PCT Search Report and Written Opinion dated Mar. 26, 2020, for PCT Application No. PCT/US2019/064243, 10 pages.
The PCT Search Report and Written Opinion dated Jun. 3, 2020 for PCT Application No. PCT/US2020/016342, 12 pages.
"Quality of Service in LTE", IP Multimedia Subsystem University, Feb. 11, 2016, retrieved Aug. 28, 2018 from «http://www.ims-university.com/blog/quality-of-service-in-lte», 9 pages.
Rosenberg, J. et al., "SIP: Session Initiation Protocol", Request for Comments 3261, Standards Track, Jun. 2002, pp. 35-36 and 46-47.
Rosenberg, J., et al., "An Offer/Answer Model with the Session Description Protocol (SDP)", Request for Comments 3264, Standards Track, Jun. 2002, pp. 5-12.
Handley, M., et al., "SDP: Session Description Protocol", Request for Comments 4566, Standards Track, Jul. 2006, pp. 22-23 and 33-38.
Sauter, "How to Get an IPv6 Prefix from the LTE Network", WirelessMoves blog, published Apr. 2016, 3 pgs.
Shepherd, "Learn About QoS in 5G Networks", found at www.linkedin.com/pulse/learn-qos-5g-networks-paul-shepherd, published Sep. 2018, 5 pgs.
Singh, "Session and Service Continuity Evolution in 5G Networks", located at http://4g5gworld.com/blog/session-and-service-continuity-evolution-5g-networks, Published Feb. 2019, 2 pgs.
"VoLTE End to End QoS Control", Red Mouse, Jun. 10, 2015, retrieved Jul. 23, 2018 from «http://hongjoo71-e.blogspot.com/2015/06/end-to-end-qos-control-in-volte.html», 5 pages.
"VoLTE Service Description and Implementation Guidelines", GSMA, Version 2.0, Oct. 7, 2014, pp. 26-30, 35-39, 52-58, and 76-80.
Extended European Search Report dated Aug. 24, 2022 for European Patent Application No. 20762124.4, 19 pages.
Office Action for U.S. Appl. No. 17/316,341, dated Aug. 4, 2022, Bongaarts, "Latency-Sensitive Network-Traffic Quality of Service", 30 pages.

* cited by examiner

LATENCY-SENSITIVE NETWORK-TRAFFIC QUALITY OF SERVICE

CROSS-REFERENCE TO RELATED APPLICATIONS

This application is a continuation of and claims priority to U.S. patent application Ser. No. 16/229,082, filed Dec. 21, 2018, titled "Latency-Sensitive Network-Traffic Quality of Service," the entirety of which is incorporated herein by reference.

BACKGROUND

Modern telecommunications networks such as cellular telephone networks can support a variety of types of session, such as voice, video, or messaging. Second-generation (2G) and third-generation (3G) cellular networks such as Global System for Mobile Communications (GSM) networks or Universal Mobile Telecommunications System (UMTS) networks generally carry streaming media over circuit-switched (CS) connections. Fourth-generation (4G) cellular networks such as Long Term Evolution (LTE) (including LTE-Advanced) networks generally carry streaming media over packet-switched (PS) connections. Those PS connections may also carry non-streaming types of data, e.g., file downloads. Many cellular networks are standardized by the Third-Generation Partnership Project (3GPP).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be, in at least one example, included in the first component or operation.

DETAILED DESCRIPTION

Overview

Figure 1:
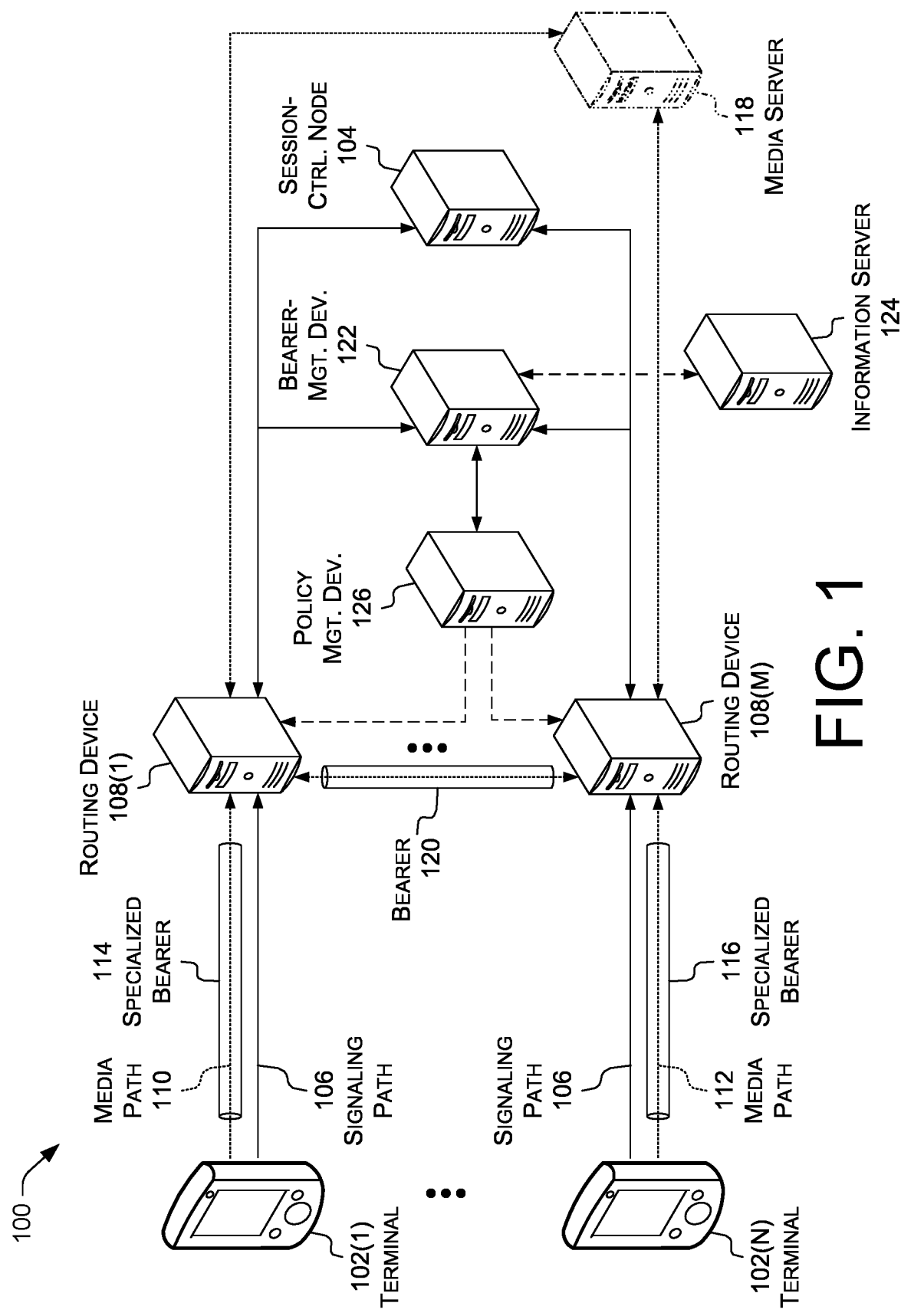
FIG. 1 illustrates an example telecommunications system providing specialized bearers (SBs).

This disclosure describes, in part, a telecommunications network configured to pvide improved QoS for latency-sensitive traffic that does not have a guaranteed bit rate (GBR). Such traffic can be carried by an appropriately-configured bearer. A bearer is an identified logical connection for conveying data in a manner determined by the bearer. For example, a bearer can have particular QoS or throughput (bits per second, bps) characteristics. A terminal can have one or more bearers open concurrently via a single radio connection. Bearer management according to some examples herein can include any of: creation of bearers, termination of bearers, assignment of bearers to terminals or traffic flows, or selection of bearers to carry particular types of traffic. Bearer assignment or selection can be performed, e.g., when bearers are created or terminated, or at handover or other changes of state of a terminal.

Some network traffic is latency-sensitive, for example, transmissions during a multiplayer game. In some prior schemes, that traffic is routed in the same way as non-latency-sensitive network traffic, such as Web-browsing traffic. In some examples herein, low-latency network communications (e.g., cellular data communications) are provided for services that would not be able to access low-latency communication services in some prior schemes. In some examples herein, traffic to or from terminals associated with authorized users is routed via specialized bearers that have low-latency QoS parameters. An app on a terminal can request a network node to create such a bearer, then use that bearer to exchange information over a connection having lower latency than might otherwise be available.

Examples of bearers can include, in LTE, data radio bearers (DRBs) between the terminal and an eNodeB, S1 bearers between the eNodeB and a Serving Gateway (S-GW), or Evolved Universal Terrestrial Radio Access Network (E-UTRAN) Radio Access Bearers (E-RABs) between the terminal and the S-GW. A bearer via one or more network(s) between a first node or device and a second node or device can include or consist of other bearers, each spanning part of a path through the network between the first node or device and the second node or device. For example, an E-RAB can include or consist of a DRB and a corresponding S1 bearer. In some examples, a bearer can carry a service data flow (SDF, 3GPP 23.203) having defined flow characteristics, or an aggregate of SDFs. In some examples, a bearer carries traffic for a particular packet data network (PDN), e.g., the Internet or an IP Multimedia Subsystem (IMS), and that traffic includes multiple SDFs, e.g., one for email and another for streaming video.

As used herein, a "terminal" is a communication device, e.g., a cellular telephone or other user equipment (UE), configured to perform, or intercommunicate with systems configured to perform, techniques described herein. Terminals can include, e.g., wireless or wired voice- or data-communication devices. A terminal can be a device that includes a user interface (e.g., as does a smartphone), or can be a device that does not include a user interface. For example, a streaming server configured to provide audio or visual content on demand can be a terminal. Such a terminal may not include a user interface, and may instead respond to other terminals that form queries and send those queries to the server in response to actions taken via interfaces at those other terminals. A terminal can be, e.g., a cellular phone, smartphone, tablet computer, personal digital assistant (PDA), personal computer (PC), laptop computer, media center, work station, etc.

The terms "session" and "communication session" as used herein include a communications path for bidirectional exchange of data among two or more terminals. Example sessions include voice and video calls, e.g., by which human beings converse; data communication sessions, e.g., between two electronic systems or between an electronic system and a user-interface device in use by a human being; or a Rich Communication Suite (RCS) session. Sessions can be carried, e.g., by cellular or data networks, e.g., LTE or IEEE 802.11 (WIFI). Other examples of networks are discussed below.

Some examples herein relate to low-latency traffic. Some examples herein relate to traffic other than audio or video traffic. Some examples herein relate to communications sessions involving the exchange of multiple types of data, e.g., voice, text, and state.

Subsection headers in this Detailed Description are solely for convenience in reading. No limitations are implied by the presence or arrangement of the subsection headers, or by the separation of features between those subsections. Some examples include features from only one subsection. Some examples include features from more than one subsection.

As used herein, the term "unique identifier" and similar terms encompass both truly unique identifiers (e.g., Ethernet MAC addresses that are unique by construction, or Version No 1 UUIDs) and identifiers with a negligible probability of collision (non-uniqueness) (e.g., SHA256 hashes of data uniquely identifying an object, or Version 4 UUIDs).

As used herein, a "random" value can be a truly random value, e.g., measured from physical phenomena, or a pseudorandom value. Examples of random values include cryptographically-strong random numbers.

Illustrative Telecommunications Networks and Components

FIG. 1 illustrates an example telecommunication system 100 and shows an overview of nodes and devices involved in provision of bearer-management services to terminals. The telecommunication system 100 includes terminals 102 (1)-102(N) (individually or collectively referred to herein with reference 102), N≥1. A terminal 102 may be or include a cellular phone or other type of terminal such as those described above.

Terminals 102 can be configured to initiate or receive communication sessions, such as a voice call, a video call, or another sort of synchronous communication. Initiation of such communications may involve communication clients and Session Initiation Protocol (SIP, RFC 3261) clients communicatively connected with components of the telecommunication system 100, e.g., session-control node 104. Session-control node 104 can be part of an application network, e.g., an IMS network, the Internet or a subset thereof (e.g., a virtual private network, VPN), or another network (e.g., a virtual private network, VPN), or another network providing services to terminal 102. The application network can also be referred to as an "upper-level" network that uses the services provided by access networks (FIG. 2) to communicate with terminals 102. System 100 can include or be connected with any number of access networks or any number of application networks. In various embodiments, the session-control node 104 represents component(s) of an IMS core network.

Signaling messages are shown as being carried over signaling path 106, which can represent a dedicated signaling link (e.g., a Signaling System 7, SS7, link) or a flow of signaling data across a link shared with non-signaling traffic (e.g., ISUP over SIGTRAN, or non-ITU TCP/IP-family protocols such as SIP). SIP can be used to establish and manage communication sessions. SIP is an IP-based protocol, so terminal 102 exchanges SIP messages with session-control node 104 via signaling path 106 carrying IP packets. Session-control node 104 can include, e.g., a proxy call session control function (P-CSCF) via which terminal 102 can access IMS services. Other signaling protocols can be additionally or alternatively be used, e.g., over Web Real-Time Communication (WebRTC) links. In some examples, session-control node 104 can include an H.323 multipoint control unit, and terminal 102 can exchange H.225.0 signaling messages with session-control node 104 via signaling path 106, e.g., for multimedia conferencing.

Each terminal 102 can exchange non-signaling data (for brevity, "media") via at least one respective media path with routing device(s) 108. Shown are M routing devices 108(1)-108(M) (individually or collectively referred to herein with reference 108), M≥1. Terminal 102(1) exchanges media with routing device 108(1) via media path 110, and terminal 102(N) exchanges media with routing device 108(M) via media path 112. Routing devices 108 can in turn route the media to other terminals or network devices (omitted for brevity). Each terminal 102 is shown as attached to a respective routing device 108, but this is not limiting. In some examples, N=M; in some examples, N≠M. An individual routing device 108 can connect with any number ≥0 of terminals. In some examples, each terminal 102 is connected to either zero or one routing devices 108 at any given time. In some examples, at least one terminal 102 is connected to more than one routing device 108 concurrently.

In some examples, session-control node 104 provides voice-calling, video-calling, or data services. Session-control node 104 can provide different QoS levels to different services. In some examples, QoS levels are identified by LTE QoS Class Identifiers (QCIs). QCIs can be used to define QoS for individual bearers. Each QCI defines particular latency, packet priority, and packet-loss rate requirements. For example, an IMS core can provide voice-over-LTE (VoLTE) data-transport services at QCI 1, video-over-LTE (ViLTE) video data-transport services at QCI 2, IMS signaling at QCI 5, and non-GBR packet data at QCI 6.

However, QCI 6, in some prior schemes, permits latency of up to 300 ms. User(s) of two or more terminals 102 may wish to exchange non-GBR packet traffic, but without incurring the latency penalty of QCI 6. In some examples, accordingly, the system 100 (or components thereof, and likewise throughout the discussion of this figure) establishes a specialized bearer (SB) 114 between terminal 102(1) and routing device 108(1), and an SB 116 between terminal 102(N) and routing device 108(M). SB 114 carries media path 110, and SB 116 carries media path 112. The SBs provide predetermined QoS levels (e.g., associated with predetermined QCIs) for packet data flows, such as media-packet flows associated with apps other than system dialers running on terminals 102. In some examples, the SBs 114,

116 provide a transparent connection to an application network, e.g., including a media server 118 (shown in phantom), permitting low-latency traffic exchange with that application network.

In some examples, multiple routing devices 108 can establish bearers between themselves to carry traffic from SBs. In the illustrated example, routing devices 108(1), 108(M) can exchange traffic via bearer 120. Terminals 102(1) can send low-latency media to terminal 102(N) via SB 114, bearer 120, and SB 116, and vice versa. Bearer 120 can be or include an SB or another type of bearer or packet flow. In some examples, traffic over bearer 120 can carry an indication of the QoS associated with SBs 114, 116, e.g., an IP Differentiated Services Code Point (DSCP) value.

In some examples, SBs 114, 116 are created on request of the respective terminals 102(1), 102(N). In some examples, a bearer-management device 122, e.g., a P-CSCF, receives requests to create SBs, e.g., a request from terminal 102(1) to create SB 114. Bearer-management device 122 determines that the request is associated with an authorized user, e.g., by exchanging messages with an information server 124. Information server 124 can include, e.g., a home location register (HLR)/home subscriber server (HSS). After determining that the user is authorized, bearer-management device 122 sends a setup message to a policy-management device 126, e.g., a policy control rules function (PCRF) node. Policy-management device 126 interacts with routing devices 108 to establish the SBs, e.g., SB 114. Other examples of bearer-management device 122 and policy-management device 126 are discussed herein.

As used herein, a message "sent to," "transmitted to," or "transmitted toward" a destination, or similar terms, can be sent directly to the destination, or can be sent via one or more intermediate network nodes or devices to the destination. Those intermediate network nodes or devices can include routing device(s) 108. Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, by changing routing information, or by changing a presentation of at least part of the message, e.g., from a SIP start-line to a SIP header or vice versa. As used herein, a "reply" message is synonymous with a "response" message. The term "reply" is used for clarity, e.g., when discussing reply messages sent in response to the receipt of messages.

Any of session-control node 104, routing device(s) 108, bearer-management device 122, information server 124, and policy-management device 126 can be or include a server or server farm, multiple, distributed server farms, a mainframe, a work station, a PC, a laptop computer, a tablet computer, an embedded system, or any other sort of device or devices. In one implementation, one or more of these may represent a plurality of computing devices working in communication, such as a cloud-computing node cluster. Examples of such components are described below with reference to FIG. 3.

Figure 2:
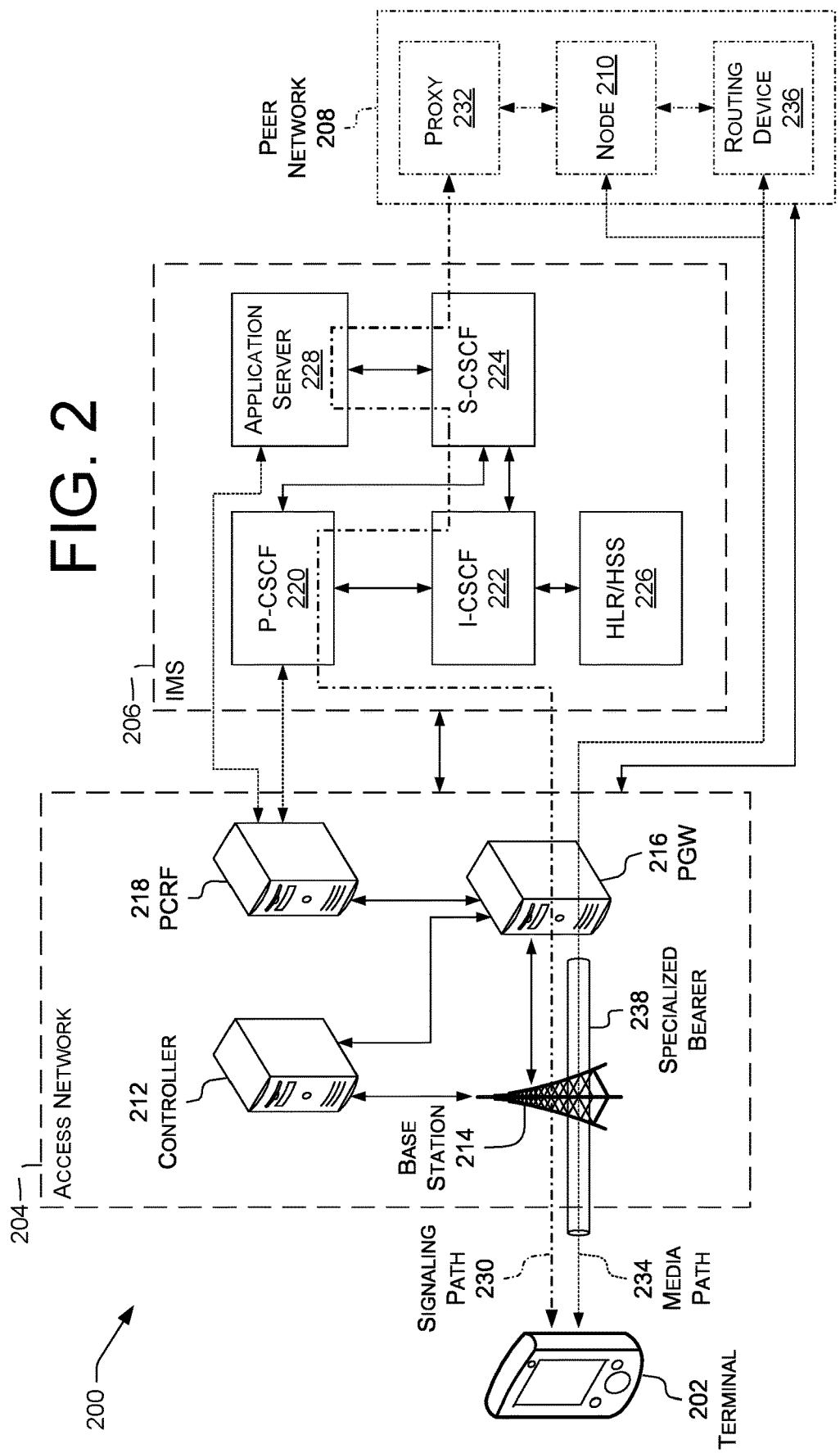
FIG. 2 illustrates an overview of nodes and devices involved in bearer selection for a terminal.

FIG. 2 illustrates an example telecommunication system 200 (which can represent system 100). Elements shown in FIG. 2 can represent corresponding elements shown in FIG. 1. Terminal 202, e.g., user equipment, communicates with access network 204 of the telecommunication system 200. Access network 204 can be any type of access network, e.g., LTE or WIFI. For example, voice calls can be carried over the first access network using VoLTE or voice-over-WIFI (VoWIFI). IMS 206 communicates with access network 204 and provides media-handling services, e.g., to route video or voice data. For example, IMS 206 can provide services permitting terminal 202 to communicate with peer telecommunications network 208 (shown in phantom), e.g., with a node 210 thereof, such as a server or terminal. Peer network 208 can be operated by the same operator as IMS 206 or by a different operator. For example, IMS 206 and peer network 208 can be two IMSes operated by the same operator, or IMSes operated by respective, different operators. In some examples, peer network 208 is a PSTN or a 2G, 3G, or LTE cellular network. In some examples, peer network 208 is the Internet or another packet network.

In the illustrated example, access network 204 includes a controller 212, e.g., a mobility management entity (MME) associated with an LTE access network. Access network 204 includes a base station 214, e.g., an LTE eNodeB 4G base station, WIFI wireless access point (WAP), or other access point, that provides connectivity to access network 204. Access network 204 also includes a packet data network gateway 216 ("PGW" or "PDN-GW") that conveys traffic between terminal 202 and networks outside the access network, e.g., IMS 206 or peer network 208. PGW 216 can represent a routing device 108. Access network 204 also includes a PCRF 218 (which can represent policy-management device 126), e.g., a server or other network device responsible for distributing policy information or interacting with policy-related network functions outside access network 204. Access network 204 can include more than one of any of these components, or can include other components not shown.

In the illustrated example, IMS 206 includes a P-CSCF 220. IMS 206 also includes an interrogating CSCF (I-CSCF) 222, a serving CSCF (S-CSCF) 224, and a HLR/HSS 226. These components can perform functions described in 3GPP or other pertinent specifications. In some examples, P-CSCF 220 can additionally or alternatively perform functions described herein, e.g., with reference to FIGS. 3-13. For example, P-CSCF 220 can communicate with PCRF 218 as described below. IMS 206 also includes an application server (AS) 228 configured to perform functions described herein, e.g., with reference to FIGS. 3-13. For example, AS 228 can communicate with PCRF 218 as described below, or can provide network relaying services as described below. In some examples, the AS 228 is an anchoring network device and proxies signaling traffic for a communication session, e.g., operating as a SIP proxy or back-to-back user agent (B2BUA). The AS 228 (or other anchoring network device, and likewise throughout) can provide session-control services to terminal 202.

In the illustrated example, a signaling path 230 of a communication session passes through base station 214 and PGW (routing device) 216 in access network 204, and then through P-CSCF 220, I-CSCF 222, S-CSCF 224, and AS 228 in IMS 206, as indicated by the dash-dot arrow (in some other examples, I-CSCF 222 is omitted or bypassed). After AS 228, the example signaling path passes back through S-CSCF 224 to a network node of peer telecommunication system 208, shown as a proxy 232. Proxy 232 can include, e.g., an S-CSCF, I-CSCF, or BGCF.

In the illustrated example, a media path 234 of the communication session passes through base station 214 and PGW 216 in access network 204. PGW 216 forwards the traffic to or from peer network 208. In the illustrated example, traffic between terminal 202 and peer node 210 is exchanged between PGW 216 and a peer routing device 236 of peer network 208.

Although peer network 208 and its components are shown in phantom, in some examples not depicted, at least one component of peer network 208 can be part of system 200. Moreover, in other examples not depicted, one or both of proxy 232 and peer routing device 236 may not be present. In some examples, peer network 208 is the Internet, node 210 is a non-IMS-connected device, and PGW 216 exchanges traffic directly with node 210. This can support low-latency use cases such as real-time messaging, computer-mediated competition, or over-the-top (OTT) video calling.

Data exchanges in computer-mediated competition or other network interactions can have a star topology, a mesh topology, or other topologies. In a star topology, each terminal 102, 202 interacts with a common media server 118 (e.g., node 210). In a mesh topology, at least one terminal 102, 202 exchanges data with another terminal 102, 202 without passing through media server 118 or a similar device.

In the illustrated example, media path 234 between terminal 202 and PGW 216 is carried via a specialized bearer (SB) 238. SB 238 can be or include, e.g., an LTE Evolved Packet System (EPS) dedicated bearer providing desired QoS characteristics, e.g., lower latency than traffic on a default bearer. SB 238 can include a DRB between terminal 202 and base station 214, an S1 bearer between base station 214 and an LTE S-GW (omitted for brevity), and an S5/S8 bearer between the S-GW and PGW 216. In some examples, SB 238 can have LTE QCI 3.

The devices and networks illustrated in FIG. 2 can be examples of the devices and networks illustrated in FIG. 1 and described above. For instance, terminal 202 can represent a terminal 102; PGW 216 can represent a routing device 108; P-CSCF 220, AS 228, or PCRF 218 can represent bearer-management device 122; PCRF 218 can represent policy-management device 126; HLR/HSS 226 can represent information server 124; signaling path 230 can represent signaling path 106; or SB 238 can represent SB 114 or 116. Accordingly, the descriptions of the devices and networks of FIG. 1 apply to the devices and networks of FIG. 2. The devices and networks of FIG. 2 may cooperate to accomplish media routing, e.g., as shown in FIG. 1 and described herein. They may also cooperate to accomplish the initiation of a communication session of terminal 202. Techniques described herein with respect to originating communication sessions can also be used for receiving (terminating) sessions or for exchanging messages sent during an established phase of a communication session, in some examples.

Example cellular access networks 204 can include a GSM or UMTS network; a universal terrestrial radio network (UTRAN) or an GSM Enhanced Data rates for GSM Evolution (EDGE) radio access network (GERAN); an E-UTRAN (e.g., LTE); an Evolution-Data Optimized (EVDO), Advanced LTE (LTE+), Generic Access Network (GAN), Unlicensed Mobile Access (UMA), GPRS, EDGE, High Speed Packet Access (HSPA), or evolved HSPA (HSPA+) network. Example non-cellular access networks 204 can include a WIFI (IEEE No 802.11), BLUETOOTH (IEEE No 802.15.1), or other local-area network (LAN) or personal-area network (PAN) access networks, e.g., in the IEEE.o 802.1* family, a satellite or terrestrial wide-area access network such as a wireless microwave access (WIMAX) network, a wired network such as the PSTN, an optical network such as a Synchronous Optical NETwork (SONET), or other fixed wireless or non-wireless networks such as Asynchronous Transfer Mode (ATM) or Ethernet, e.g., configured to transport IP packets, e.g., IPv4, IPv6, or any other evolution of an IP-based technology.

In some examples, access network 204 can include a base station (e.g., an eNodeB or gNodeB), a radio network controller (RNC) (e.g., for UMTS access networks), or other elements. A cellular network or a wireless data network may use any sort of air interface, such as a code division multiple access (CDMA), time division multiple access (TDMA), frequency division multiple access (FDMA), or orthogonal frequency division multiple access (OFDMA) air interface.

The telecommunication system 200 may also include a number of devices or nodes not illustrated in FIG. 2. Nonlimiting examples of such devices or nodes include an Access Transfer Gateway (ATGW), a serving GPRS support node (SGSN), a gateway GPRS support node (GGSN), a session border controller (SBC), a visitor location register (VLR), an ISBC or IBCF, a BGCF, or a media gateway (MGW), an S-GW, or a non-3GPP-access interworking function (N3IWF). Similarly, throughout this disclosure, other nodes or devices can be used in conjunction with listed nodes or devices. For example, a telecommunications network can include many core network nodes or devices, only some of which implement functions described herein for core network nodes or devices. IMS 206 may further include a number of devices or nodes not illustrated in FIG. 2, such as a presence server and one or more additional CSCFs. A core network of the telecommunications network may be a GPRS core network or an evolved packet core (EPC) network, or may include elements from both types of core networks.

Figure 3:
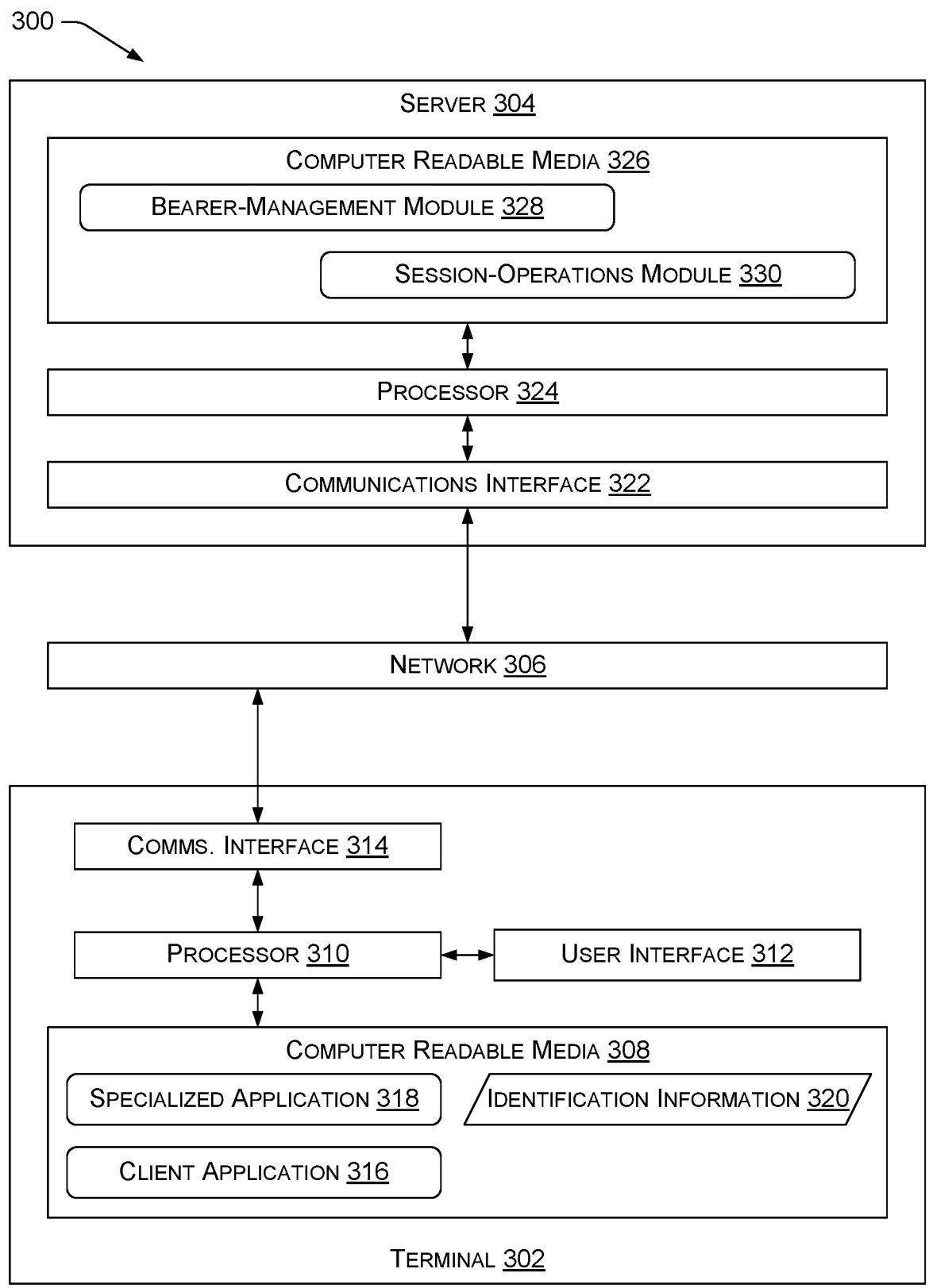
FIG. 3 is a block diagram illustrating components of a system that provides bearer selection according to some implementations.

FIG. 3 is a block diagram illustrating a system 300 permitting media transport according to some implementations. The system 300 includes a terminal 302, e.g., a wireless phone or other terminal such as a terminal 102, 202, coupled to a server 304 via a network 306. The server 304 can represent a bearer-management device 122 (e.g., P-CSCF 220), a policy-management device 126 such as PCRF 218, an information server 124 (e.g., HLR/HSS 226), or another control device or information server of a telecommunications network.

The network 306 can include one or more networks, such as a cellular network and a data network. In some examples, network 306 may include any network configured to transport IP packets, e.g., IPv4, IPv6, or any future IP-based network technology or evolution of an existing IP-based network technology. For example, the network 306 can include one or more core network(s) connected to terminal(s) via one or more access network(s) (e.g., access network 204).

Terminal 302 can include one or more computer readable media (CRM) 308, such as memory (e.g., random access memory (RAM), solid state drives (SSDs), or the like), disk drives (e.g., platter-based hard drives), another type of computer-readable media, or any combination thereof. Terminal 302 can include one or more processors 310 configured to execute instructions stored on CRM 308. The CRM 308 can be used to store data and to store instructions that are executable by the processors 310 to perform various functions as described herein. The CRM 308 can store various types of instructions and data, such as an operating system, device drivers, etc. The processor-executable instructions can be executed by the processors 310 to perform the various functions described herein.

The CRM 308 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 310. Tangible computer-readable media can include volatile and nonvolatile, removable and non-removable media implemented in any method or technology for storage of information, such as computer readable instructions, data structures, program modules, or other data.

Processor(s) 310 can include, e.g., e.g., one or more processor devices such as central processing units (CPUs), microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). For brevity, processor 310 and, if required, CRM 308, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 324 and, if required, CRM 326, discussed below. Accordingly, functions described as carried out by processor(s) 310 in response to instructions stored on a CRM 308 can additionally or alternatively be performed by a control unit configured to perform functions described herein without reading instructions to do so from CRM 308.

For brevity, discussions of functions performed "by" module(s) refer, in the context of processor-executable instructions, to functions performed in response to processor-executable instructions of the referred-to module(s). In the context of FPGAs or other control units not using processor-executable instructions, discussions of functions performed "by" module(s) refer to functions performed by the special-purpose logic or other configuration of those module(s).

Terminal 302 can further include a user interface (UI) 312, e.g., including an electronic display device, a speaker, a vibration unit, a touchscreen, or other devices for presenting information to a user and receiving commands from the user, e.g., under control of processor(s) 310. Terminal 302 can further include one or more communications interface(s) 314 configured to selectively communicate (wired or wirelessly) via the network 306, e.g., via an access network, under control of the processor(s) 310.

CRM 308 can include processor-executable instructions of a client application 316. The client application 316, e.g., a native or other dialer, can permit a user to originate and terminate communication sessions associated with the terminal 302, e.g., a wireless phone. The client application 316 can additionally or alternatively include an SMS, RCS, or presence client, or a client of another telephony service offered by the server 304. The client application 316 can additionally or alternatively include an app a Web browser configured to communicate via WebRTC or other non-3GPP protocols.

CRM 308 can additionally or alternatively store processor-executable instructions of a specialized application 318, e.g., a smartphone app or other program that, when executed by processor 310, communicates via specialized bearers (SBs) as described herein, e.g., with reference to FIGS. 14-17. Specialized application 318 is referred to subsequently, for brevity and without limitation, as an "app."

CRM 308 can additionally or alternatively store identification information 320 associated with terminal 302 or a user thereof. For example, CRM 308 can include a subscriber identity module (SIM) card storing, as at least part of identification information 320, an International Mobile Subscriber Identity (IMSI), a Mobile Subscriber International Subscriber Directory Number (MSISDN), a username, an e-mail address, or another type of identification information.

In some examples, server 304 can communicate with (e.g., is communicatively connectable with) terminal 302 or other devices via one or more communications interface(s) 322, e.g., network transceivers for wired or wireless networks, or memory interfaces. Example communications interface(s) 322 can include ETHERNET or FIBRE CHANNEL transceivers, WIFI radios, or DDR memory-bus controllers (e.g., for DMA transfers to a network card installed in a physical server 304).

The server 304 can include one or more processors 324 and one or more CRM 326. The CRM 326 can be used to store processor-executable instructions of a bearer-management module 328 and a session-operations module 330. The processor-executable instructions can be executed by the one or more processors 324 to perform various functions described herein, e.g., with reference to FIGS. 3-13. In some examples, server 304 can be configured to, e.g., by executing the processor-executable instructions, perform functions described herein with reference to FIGS. 3-13.

Illustrative Operations

Figure 4A:
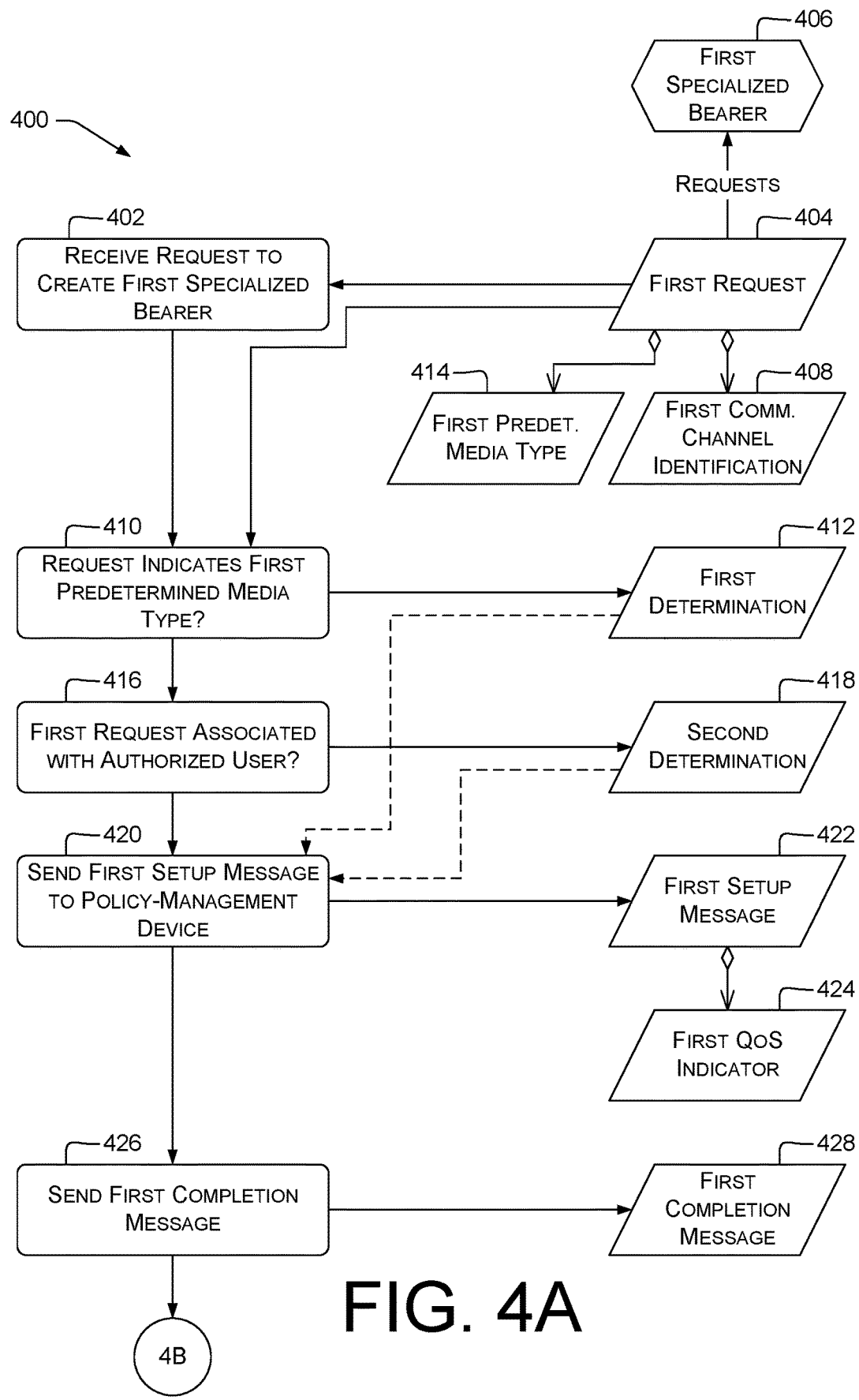
FIG. 4A illustrates a portion of an example bearer-selection process performed in a telecommunications network.
Figure 4B:
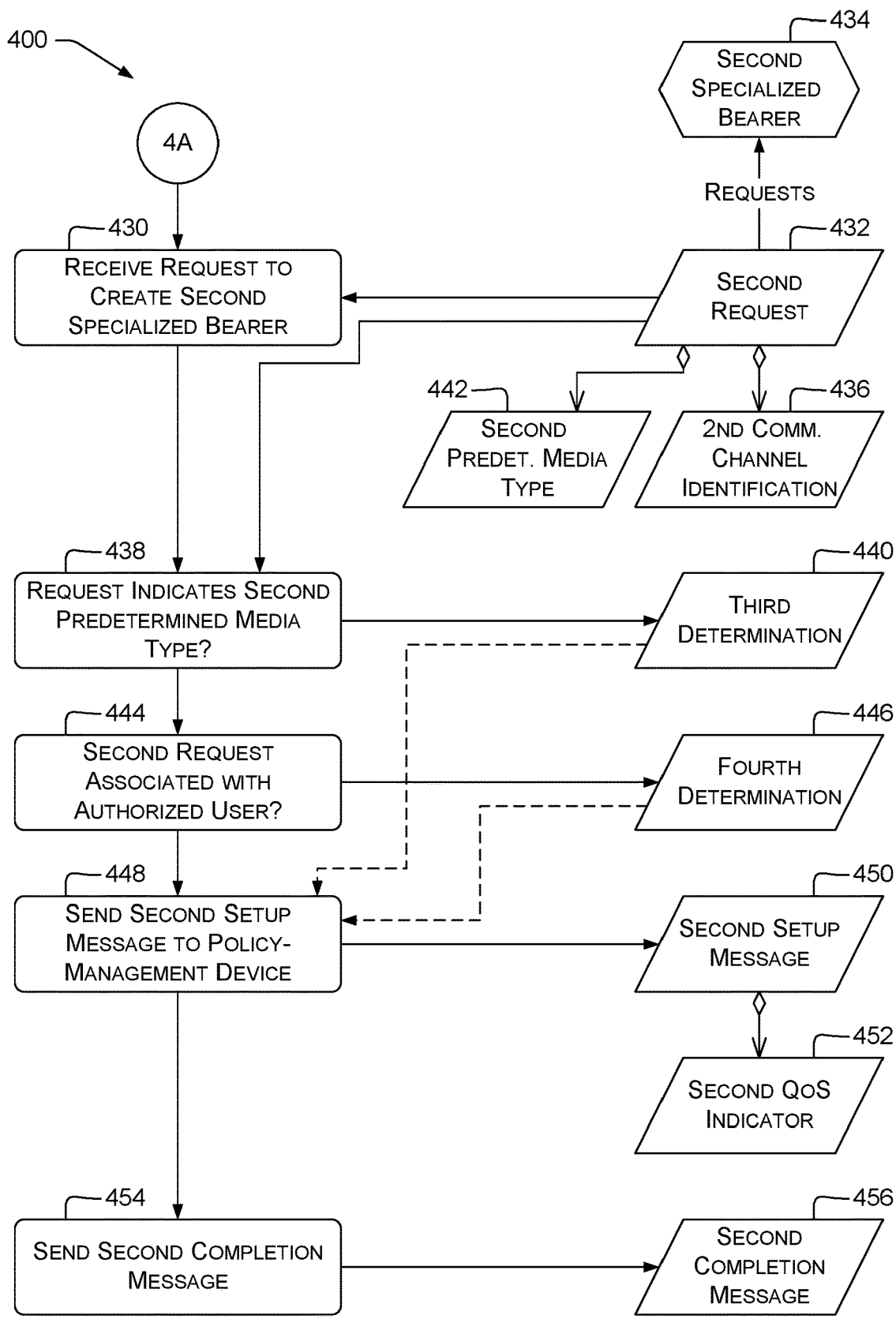
FIG. 4B illustrates another portion of the example bearer-selection process of FIG. 4A.

FIGS. 4A and 4B are dataflow diagrams together illustrating an example process 400 for bearer management (e.g., creation), and related data items. Process 400 can be performed, e.g., by a control device such as a server 304 of a telecommunications system 300, e.g., including communications interface 322 and at least one processor 324. Server 304 can be or include, e.g., a bearer-management device 122 such as P-CSCF 220. In some examples, the server 304 includes control unit(s) configured to perform operations described below, e.g., in response to computer program instructions of the bearer-management module 328 or the session-operations module 330. For example, operations 426 and 454 can be performed by (e.g., in response to instructions of, as noted above) the session-operations module 330 and the remaining operations can be performed by the bearer-management module 328. Alternatively, all the operations of process 400 can be performed by the bearer-management module 328.

Process 400 can be performed by bearer-management device 122 communicatively connectable with one or more routing devices 108, e.g., PGWs, and with a policy-management device 126. Process 400 can include providing services to one or more terminals 302, e.g., connected to one or more routing devices 108. In some examples, the one or more routing devices 108 are configured to convey traffic between a first specialized bearer (SB) 406 and a second SB 434, both discussed below.

Operations shown in FIG. 4 and in FIGS. 5-17, discussed below, can be performed in any order except when otherwise specified, or when data from an earlier step is used in a later step. For clarity of explanation, reference is herein made to various components shown in FIGS. 1-3 that can carry out or participate in the steps of the example methods. It should be noted, however, that other components can be used; that is, example method(s) shown in FIGS. 4-17 are not limited to being carried out by the identified components, and are not limited to including the identified operations or messages.

At 402, the control unit can receive, from a first network terminal 102 (or 202, 302, and likewise throughout this discussion) via a communications interface, a first request 404 to create a first SB 406 (bearers are depicted using hexagons throughout FIGS. 4-17). The first request 404 can identify a first communication channel. For example, the first request 404 can include identification 408 of the first communication channel. In some examples, the first request can be or include a SIP INVITE request or other SIP or non-SIP request. The identification 408 can include, e.g., a network address, port, or address/port pair; a peer address, port, or address/port pair; a unique identifier; an address or other identifier of a multicast group; a domain name; or a Uniform Resource Identifier (URI), e.g., a tel: URI. In some examples, the identification 408 is not an identifier of a party reachable via VoLTE or ViLTE from the server 304. In some examples, the identification 408 is not an identifier of a party reachable via VoLTE or ViLTE from the first network terminal 102, 202, 302. In some examples, identification 408 can be shared among multiple users who desire to exchange low-latency traffic. In some examples, identification 408 is human-readable or -expressible, so that multiple users can communicate identification 408 amongst each other, e.g., verbally or in writing. For example, identification 408 can be expressed as a string of at most n characters, e.g., n=8, 10, 16, 20, 32, or 64; as a string of words using, e.g., the PGP word list; or as a series of at most n numbers, e.g., n=4, 5, 6, 8, or 10.

At 410, the control unit can make a first determination 412 that the first request 404 indicates a first predetermined media type 414. Solely for brevity hereafter, "mtype" is used as an abbreviation for "predetermined media type." For example, the control unit can locate data in first request 404 indicating the first mtype 414. The control unit can then compare the data to a stored list of one or more mtypes, and store data of the first determination 412 indicating that the first mtype 414 is found in the stored list.

The data in first request 404 can include, e.g., a header, a header-field value (e.g., a value of a SIP Content-Type header), or a body element. A body element can include, e.g., an SDP m=line, or the value thereof, or the value in an Rx-interface (Diameter) Media-Type AVP (3GPP TS 29.214 v15.4.0 § 5.3.19). In some examples, the first mtype 414 is not an audio media type, and the first mtype 414 is not a video media type. For example, the first mtype 414 can include an SDP m=media description type other than "audio" or "video"; or the first mtype 414 can include an Rx Media-Type AVP other than AUDIO or VIDEO.

In some examples, the first mtype 414 can be, e.g., a predetermined value associated with low-latency traffic, e.g., an SDP m=line value of "zephyr" or "fast-data"; a SIP Content-Type of "application/fast-data"; or an Rx Media-Type value of 42 (or another predetermined value between 7 and 0xFFFF_FFFE, inclusive). In some examples, first mtype 414 has a value different from any or all of: the media values listed in RFC 4566 § 8.2.1 (SDP "media" values) and the values listed in in 29.214 § 5.3.19 for the Media-Type AVP.

At 416, the control unit can make a second determination 418 that the first request 404 is associated with a first authorized user. In some examples, operation 416 is performed before operation 410 instead of after. For example, the first request can include user information, e.g., a SIP From: header value, a source IP address or address/port combination, an IMSI, or another identifier of a user associated with terminal 102. The control unit can retrieve, from information server 124, authorization information associated with the user information. For example, the control unit can query the information server 124 via Diameter to retrieve an AVP indicating whether the user is authorized to create the first SB 406.

Some prior schemes, such as some VoLTE implementations, do not apply user-based service-authorization control to SIP requests at the P-CSCF or other bearer-management device 122. These schemes permit any SIP-connected user to send SIP requests, e.g., to the IMS Access Point Name (APN), via a terminal 102 known to information server 124 and registered with bearer-management device 122. By contrast, some examples using operation 416 permit controlling access to SBs. This can increase network robustness by reducing the chance that too many SBs will be requested or used concurrently.

At 420, the control unit can send a first setup message 422 via the communications interface to a policy-management device 126, e.g., PCRF 218. The control unit can perform operation 420 in response to the first determination 412 and to the second determination 418. The first setup message 422 can request establishment of the first SB 406. The first setup message 422 can include a first QoS indicator 424. In some examples, the first setup message 422 includes an Rx Diameter AA-Request (AAR) message carrying a Media-Type or QoS-Information AVP associated with the requested low-latency traffic characteristics. In some examples, the AAR can include information directly indicating an LTE QCI (or other QoS parameters for first SB 406), e.g., a QoS-Class-Identifier AVP. In some other examples, the AAR can include information the policy-management device 126 will use to determine the QCI (or other QoS parameters). In some examples using QCIs, the QCI can be an operator-specific value or a spare value. For example, the first QoS indicator 424 can indicate a QCI∈{10-64, 67, 68, 71-74, 76-78, 81, 86-127, 128-254}; or a QCI in the range 128-254 (3GPP TS 29.212 v15.3.0 § 5.3.17).

At 426, the control unit can send, to the first network terminal, a first completion message 428 indicating establishment of the first SB 406. First completion message 428 can include, e.g., a SIP 200 OK or other 1xx or 2xx response. In some examples, the control unit sends first completion message 428 independently of any other terminals 102 that may be participating in or communicating via the first communications channel. For example, each terminal 102 can send an INVITE and receive an OK with respect to its own SB 114.

Figure 10:
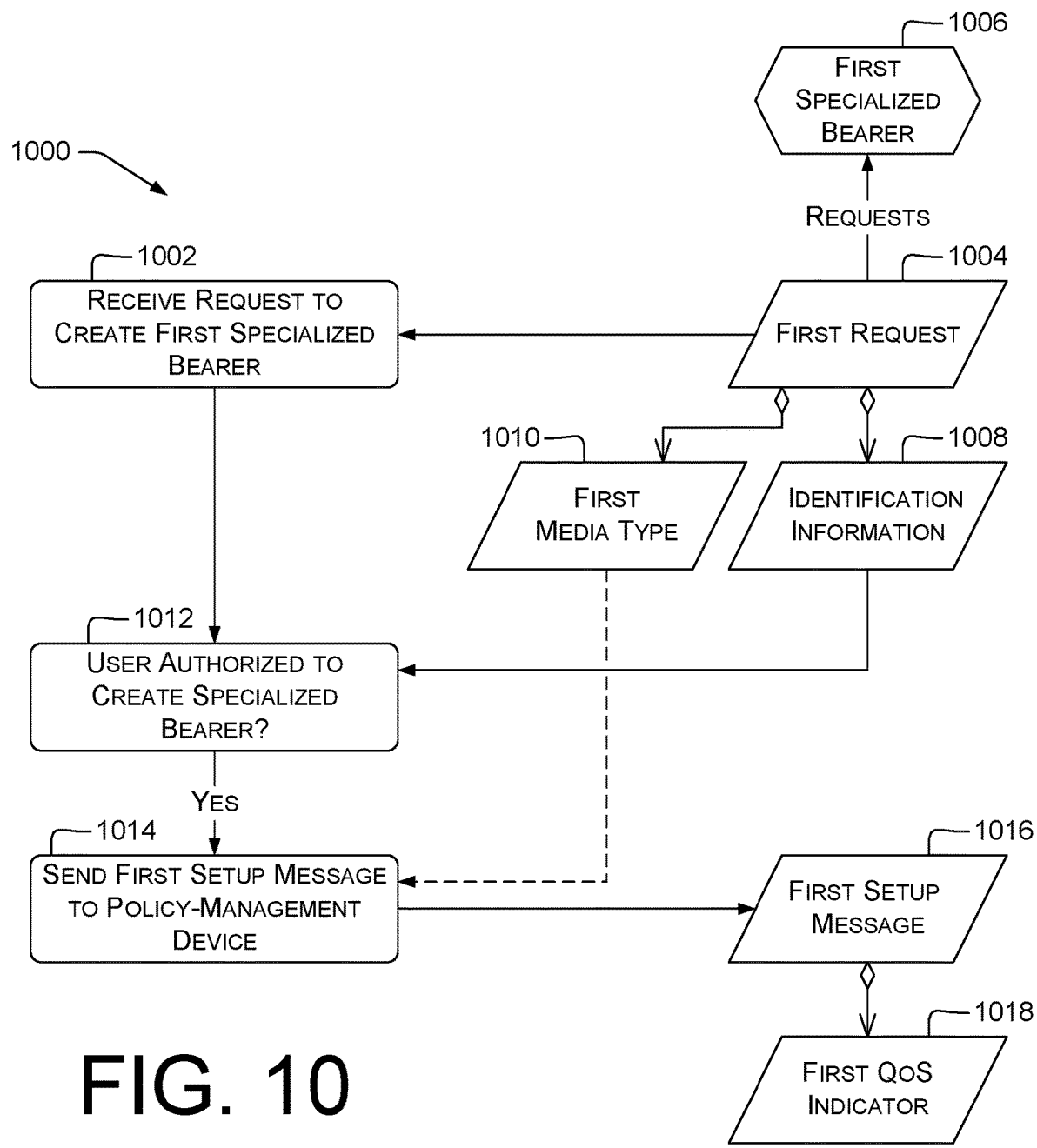
FIG. 10 illustrates an example authorization-verification and bearer-creation process.
Figure 11:
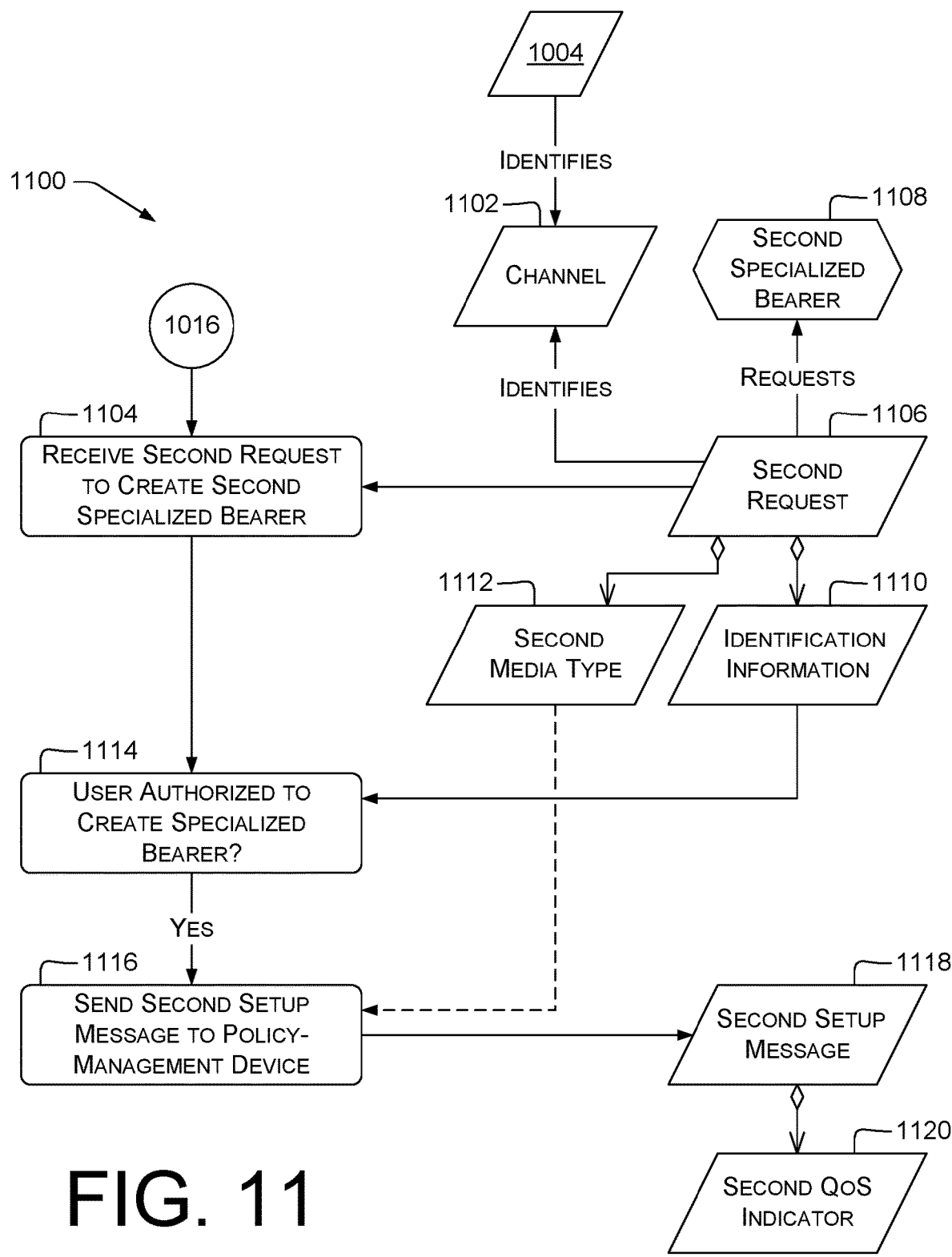
FIG. 11 illustrates an example process of creating multiple specialized bearers for a channel.

FIG. 4B shows further operations of process 400 performed, e.g., by a control unit of bearer-management device 122. Operation 426 is followed by operation 430 in the illustrated example. In some examples, at least one of operations 402-426 is followed by operation 430. In some examples, operations of FIG. 4B are performed before operations of FIG. 4A, and operation 454 is followed by operation 402. In some examples, operations of FIGS. 4A and 4B are performed in parallel, e.g., by multiple control units or by timesliced operation of a single control unit. Accordingly, operations of FIG. 4A can be interleaved with operations of FIG. 4B in any combination. This is also true of FIGS. 4A, 4B, and 5; FIGS. 10 and 11; and FIGS. 14 and 15.

At 430, the control unit can receive, from a second network terminal 102, 202, 302 via the communications interface, a second request 432 to create a second SB 434. The second request 432 can identify a second communication channel. For example, the second request 432 can include identification 436 of the second communication channel.

In some examples, the first communication channel is communicatively connected with the second communication channel. For example, in a communication between first and second terminals, the first communication channel can be identified (#408) by the address/port at the first terminal, and the second communication channel can be identified (#436) by the address/port at the second terminal. In some examples, the first communication channel is the same as the second communication channel. For example, the first and second communication channels can both be identified by the same multicast address, e.g., an Ethernet or IPv4 multicast address. Some of the examples in this paragraph can provide a virtual LAN, with the INVITE specifying a virtual lobby or group to join.

At 438, the control unit can make a third determination 440 that the second request 432 indicates a second predetermined media type (mtype) 442. Examples are discussed herein, e.g., with reference to operation 410. In some examples, the second mtype 442 is not an audio media type, and the second mtype 442 is not a video media type. Examples are discussed herein, e.g., with reference to first mtype 414.

At 444, the control unit can make a fourth determination 446 that the second request 432 is associated with a second authorized user. Examples are discussed herein, e.g., with reference to operation 416. The second authorized user can be the same as the first authorized user, or can be a different user. In some examples, operation 444 is performed before operation 438 instead of after.

At 448, the control unit can send a second setup message 450 via the communications interface to the policy-management device 126. The control unit can send the second setup message 450 in response to the third determination 440 and to the fourth determination 446. Examples are discussed herein, e.g., with reference to operation 420. The second setup message 450 can request establishment of the second SB 434. The second setup message 450 can include a second QoS indicator 452. Second QoS indicator 452 can be the same (e.g., have the same value) as the first QoS indicator 424, or can be different therefrom.

At 454, the control unit can send, to the second network terminal, a second completion message 456 indicating establishment of the second SB 434. Examples are discussed herein, e.g., with reference to operation 426. As discussed above with reference to operation 426, the control unit can send the second completion message 456 independently of any other terminals 102 that may be attached/attaching to the second communication channel (#436) or communicating thereby.

In some examples, the second request 432 identifies the first network terminal 102. For example, second request 432 from terminal 102(N) can identify terminal 102(1). In some examples, second request 432 can include a network address or hostname of the first network terminal 102, or an MSISDN or other identifier of a user or subscriber associated with the first network terminal 102. This can permit establishing a virtual LAN via SBs 406, 434, with the first network terminals 102 hosting the virtual LAN and other terminal(s) 102 joining the virtual LAN.

Figure 5:
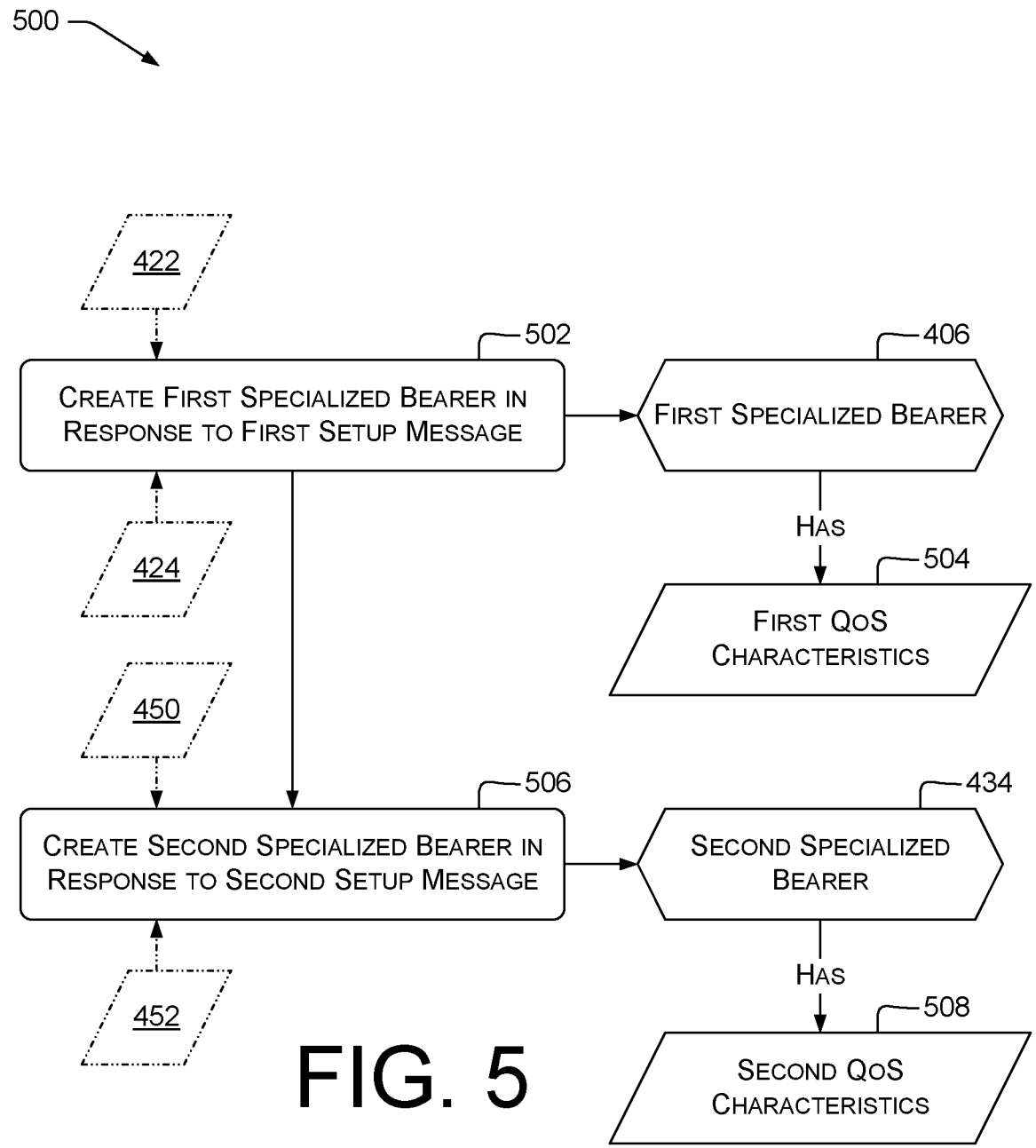
FIG. 5 illustrates an example process for creating multiple specialized bearers.

FIG. 5 is a dataflow diagram illustrating an example process 500 for bearer management and related data items. Process 400 can be performed, e.g., by a server 304 of a telecommunications system 300, e.g., including communications interface 322 and at least one processor 324. Server 304 can be or include, e.g., a policy-management device 126 such as PCRF 218. In some examples, the server 304 includes control unit(s) configured to perform operations described below, e.g., in response to computer program instructions of the bearer-management module 328. In some examples, operation 502 is performed before operation 506; in other examples, operation 506 is performed before operation 502.

At 502, the control unit can create the first specialized bearer (SB) 406 having first QoS characteristics 504 in response to the first setup message 422. In some examples, operation 502 can include receiving the first setup message 422 from the bearer-management device 122. Operation 502 can include, e.g., sending messages to a routing device 108 such as PGW 216. Operation 502 can include sending a Diameter Gx Re-Auth-Request (RAR) or CC-Answer (CCA) command from PCRF 218 to PGW 216, in some examples. The RAR or CCA can include a QoS-Information AVP (3GPP TS 29.212 v15.3.0 § 4.5.5.0, § 5.3.16, § 5.3.17), e.g., as discussed herein with reference to first QoS indicator 424.

In some examples, the first SB 406 permits exchange of first data between the first network terminal 102 and at least one of the one or more routing devices 108 (e.g., PGW 216). In some examples, the first QoS characteristics 504 are associated with the first QoS indicator 424.

In some examples, the first SB 406 is not a VoLTE bearer; and the first SB 406 is not a ViLTE bearer. For example, the QCI of first SB 406 can be other than 1, 2, or 5.

At 506, the control unit can create the second SB 434 having second QoS characteristics 508 in response to the second setup message 450. In some examples, operation 502 can include receiving the second setup message 450 from the bearer-management device 122. Examples are discussed herein, e.g., with reference to operation 502.

In some examples, the second SB 434 permits exchange of second data between the second network terminal and at least one of the one or more routing devices 108, e.g. routing device 108(1) or 108(M). In some examples, the first SB 406 and the second SB 434 are connected to the same routing device 108. In some examples, the first SB 406 and the second SB 434 are connected to respective, different routing devices 108. In some examples, the second QoS characteristics 508 are associated with the second QoS indicator 452. Examples are discussed herein, e.g., with reference to the first QoS characteristics 504.

In some examples, the second SB 434 is not a VoLTE bearer; and the second SB 434 is not a ViLTE bearer. Examples are discussed herein, e.g., with reference to the first SB 406 and the first QoS characteristics 504.

Figure 6:
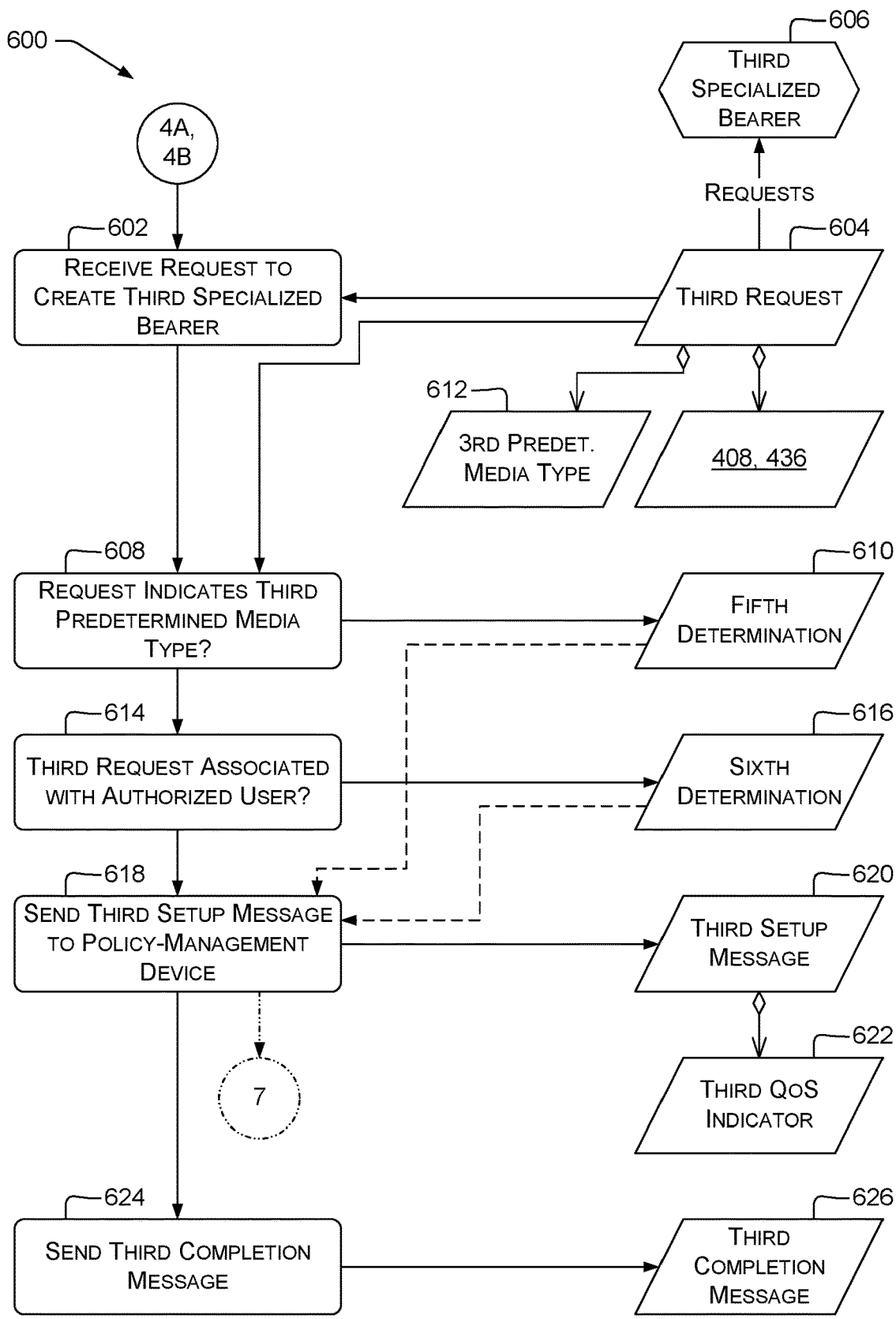
FIG. 6 illustrates an example bearer-selection process.

FIG. 6 is a dataflow diagram illustrating an example process 600 performed by server(s) 304 for bearer management and related data items. In some examples, server(s) 304, e.g., a bearer-management device 122, include control unit(s) In some examples, the server 304 includes control unit(s) configured to perform operations described below, e.g., in response to computer program instructions of the bearer-management module 328 or the session-operations module 330. For example, operation 624 can be performed by the session-operations module 330 and the remaining operations can be performed by the bearer-management module 328. Alternatively, all the operations of process 400 can be performed by the bearer-management module 328.

Figure 7:
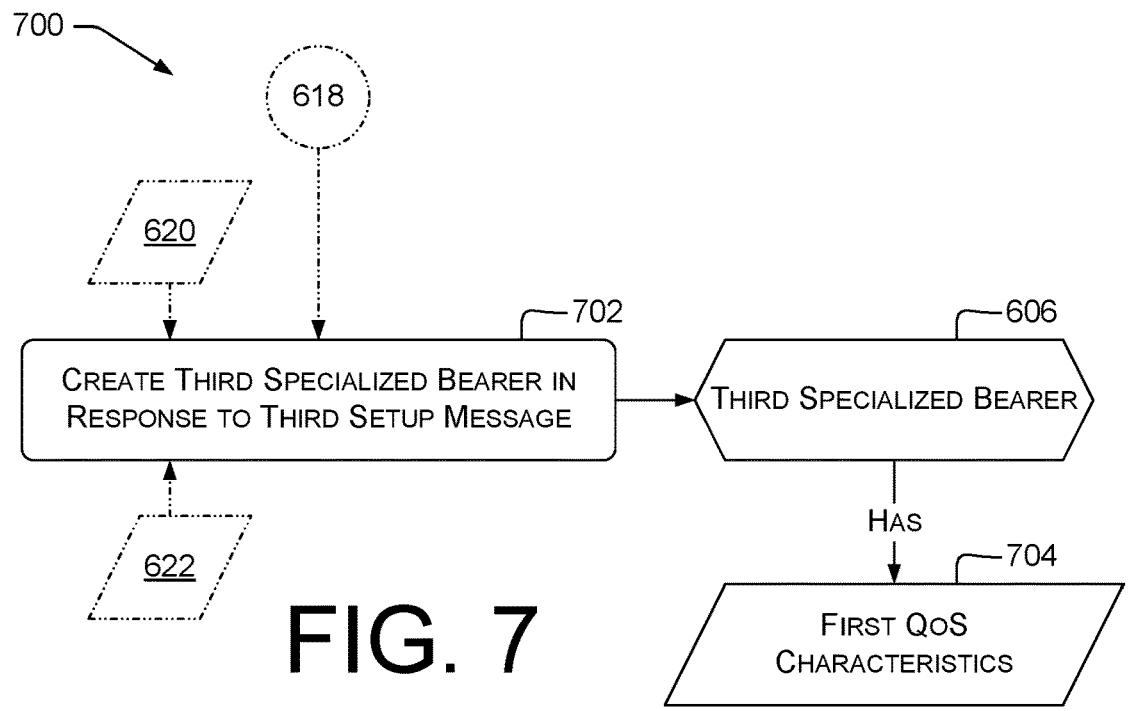
FIG. 7 illustrates an example process for creating specialized bearers.
Figure 8:
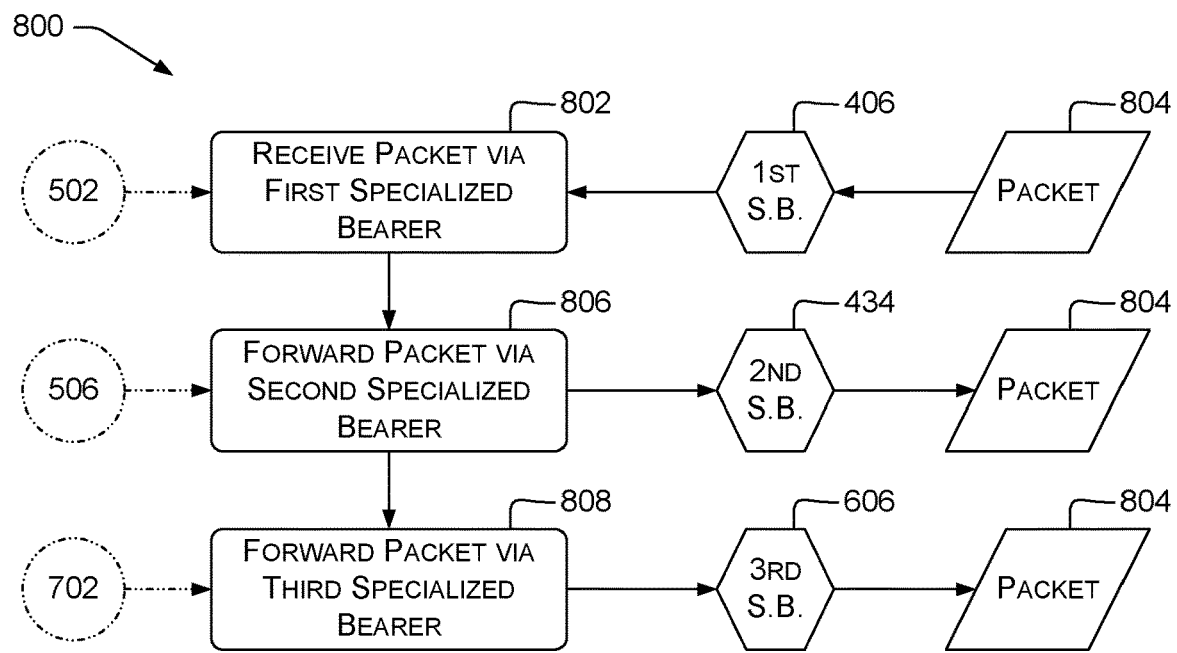
FIG. 8 illustrates an example process of forwarding packets via specialized bearers.

In some examples, process 600 cooperates with processes 700 and 800. The division of operations between FIGS. 6-8 illustrates some example configurations and is not limiting. For example, a single physical device may implement virtual P-CSCF, PCRF, and PGW functions, and so perform all the operations of processes 600, 700, and 800. In some examples, operations of process 400 are performed before (as shown) or at least partly in parallel with operations of process 600.

At 602, the control unit of bearer-management device 122 can receive, from a third network terminal 102 via a communications interface, a third request 604 to create a third specialized bearer (SB) 606. The third request can identify at least one of the first communication channel or the second communication channel. For example, the third request 604 can include the identification 408 or the identification 436. Examples are discussed herein, e.g., with reference to operation 402.

At 608, the control unit can make a fifth determination 610 that the third request 604 indicates a third predetermined media type ("mtype") 612. Examples are discussed herein, e.g., with reference to operation 410.

In some examples, the third mtype 612 is not an audio media type, and the third mtype 612 is not a video media type. Examples are discussed herein, e.g., with reference to first mtype 414.

At 614, the control unit can make a sixth determination 616 that the third request 604 is associated with a third authorized user. Examples are discussed herein, e.g., with reference to operation 416.

At 618, the control unit can send a third setup message 620 via the communications interface to the policy-management device 126. The control unit can send the third setup message 620 in response to the fifth determination 610 and to the sixth determination 616. The third setup message 620 can request establishment of the third SB 606. The third setup message 620 can include a third QoS indicator 622. Examples are discussed herein, e.g., with reference to operation 420 and first setup message 422. Operation 618 can be followed by operation 702, FIG. 7.

At 624, the control unit can send, to the third network terminal 102, a third completion message 626 indicating establishment of the third SB 606. Examples are discussed herein, e.g., with reference to operation 426.

FIG. 7 is a dataflow diagram illustrating an example process 700 performed by server(s) 304 for bearer management (e.g., creation) and related data items. In some examples, server(s) 304, e.g., a policy-management device 126, include control unit(s) configured to perform operations described below, e.g., in response to computer program instructions of the bearer-management module 328. In some examples, operation 702 can follow operation 618.

At 702, the control unit of the policy-management device 126 can create the third specialized bearer (SB) 606 having third QoS characteristics 704 in response to the third setup message 620. The third SB 606 can permit exchange of third data between the third network terminal 102 and at least one of the one or more routing devices 108. The third QoS characteristics 704 can be associated with the third QoS indicator 622. Examples are discussed herein, e.g., with reference to operation 502 and first QoS characteristics 504.

FIG. 8 is a dataflow diagram illustrating an example process 800 performed by server(s) 304 for data exchange, and related data items. In some examples, server(s) 304, e.g., a routing device 108, include control unit(s) configured to perform operations described below, e.g., in response to computer program instructions of the session-operations module 330. In some examples, operations 802-808 can be performed after all of operations 502, 506, and 702. In some examples, operation 802 can be performed after operation 502; operation 806 can be performed after operations 502 and 506; or operation 808 can be performed after operations 502 and 702. In some examples, operation 808 can be performed or at least partly in parallel with operation 806.

At 802, the control unit of the routing device 108 can receive a packet 804 via the first specialized bearer (SB or "S.B.") 406. For example, the control unit can receive packet 804 from a first terminal 102, e.g., via an EPS bearer associated with first SB 406. Packet 804 can be carried or over, or tunneled via, an S5/S8 interface from a serving gateway (SGW) or other routing device 108.

At 806, the control unit can forward the packet 804 to the second SB 434. For example, the control unit can transmit the packet 804, or a copy or version thereof, via an S5/S8 interface or tunnel towards the second SB 434. This can be done using, e.g., IP routing based on routing tables exchanged by exterior gateway protocols or interior gateway protocols.

At 808, the control unit can forward the packet 804 to the third SB 606. Examples are discussed herein, e.g., with reference to operation 806. Although the figure references packet 804 three times, forwarding of the packet 804 at operations 806 and 808 can include sending data not identical to packet 804.

Various examples using at least one of FIGS. 6-8, e.g., all of FIGS. 6-8, can provide virtual-LAN routing between at least three terminals, each of which is associated with a respective, different SB (e.g., SBs 114, 116). This can permit exchange of low-latency traffic among groups of terminals 102.

Figure 9:
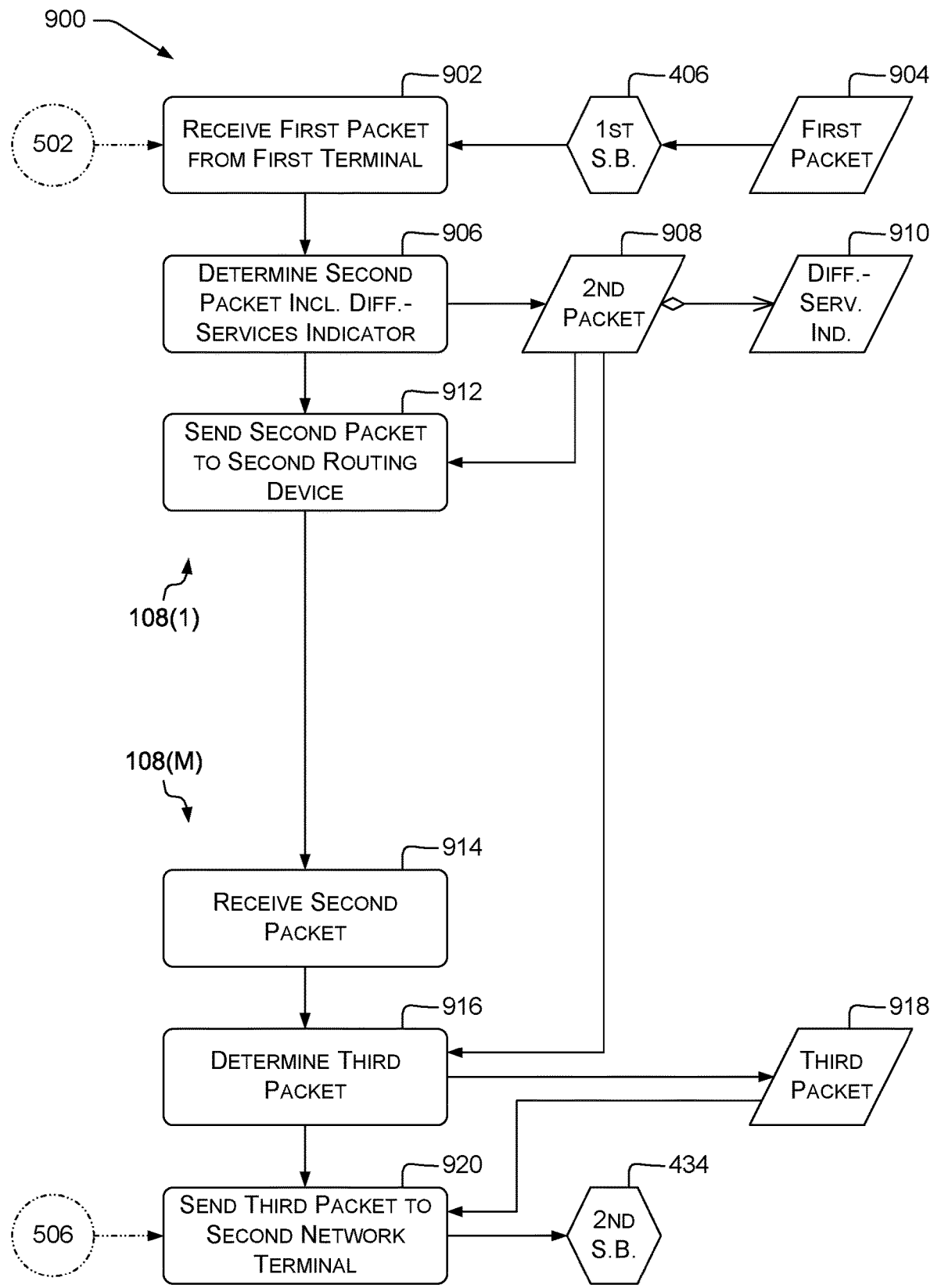
FIG. 9 illustrates an example process of forwarding packets via specialized bearers using Internet Protocol (IP)-based Quality of Service (QoS).

FIG. 9 is a dataflow diagram illustrating an example process 900 performed by server(s) 304 for data exchange or routing, and related data items. In some examples, server(s) 304, e.g., routing device(s) 108, include control unit(s) configured to perform operations described below, e.g., in response to computer program instructions of the session-operations module 330. In some examples, at least: operation 902 can be performed after operation 502; operation 920 can be performed after operation 506; operation 802 can include operation 902; operation 806 can include operations 906 and 912; operation 808 can include operations 906 and 912; operation 806 can include operations 916 and 920; or operation 808 can include operations 916 and 920.

In some examples, the one or more routing devices 108 include a first routing device 108(1) and a second, different routing device 108(M). In some examples, the first routing device 108(1) performs operations 902-912. In some examples, the second routing device 108(M) performs operations 914-920.

At 902, the control unit of the first routing device 108(1) can receive a first packet 904 from the first network terminal, e.g., terminal 102(1). Examples are discussed herein, e.g., with reference to operation 802. For example, the control unit can receive the packet via the first specialized bearer (SB) 406.

At 906, the control unit of the first routing device 108(1) can determine a second packet 908 based at least in part on the first packet, the second packet comprising a differentiated-services indicator 910 associated with the first QoS characteristics 504. The differentiated-services indicator 910 can be or include, e.g., an IP DSCP, Precedence, or Type of Service (ToS) value. For example, the control unit can use a stored table to determine a DSCP based on the QCI of the first SB 406 or other information in the first QoS indicator 424. An example of such a table is GSMA FCM.01 v2.0 (October 2014) § 3.7.4, Table 3. In some examples, the stored table used by the control unit includes at least one value not found in FCM.01. In some examples not shown, the first terminal 102(1) includes a differentiated-services indicator in the first packet 904 before sending first packet 904.

At 912, the control unit of the first routing device 108(1) can send the second packet 908 to the second routing device 108(M). In some examples, the control unit can send the second packet 908 over bearer 120 between routing device 108(1) and routing device 108(M). Examples are discussed herein, e.g., with reference to operation 806. Operation 912 can precede operation 914.

At 914, the control unit of the second routing device 108(M) can receive the second packet 908, e.g., via a network interface configured to receive packets via bearer 120.

At 916, the control unit of the second routing device 108(M) can determine a third packet 918 based at least in part on the second packet 908. Examples are discussed herein, e.g., with reference to operation 806. For example, third packet 918 may exclude the differentiated-services indicator 910 or include a different differentiated-services indicator than differentiated-services indicator 910. Additionally or alternatively, third packet 918 may have an increased hop count or decreased time-to-live compared to second packet 908. Additionally or alternatively, third packet 918 may differ from second packet 908 in the presence or value of at least one header or field.

At 920, the control unit of the second routing device 108(M) can send the third packet 918 to the second network terminal, e.g., terminal 102(N). Examples are discussed herein, e.g., with reference to operation 806.

FIG. 10 is a dataflow diagram illustrating an example process 1000 for bearer management and related data items. Process 1000 can be performed, e.g., by a server 304 of a telecommunications system 300, e.g., including communications interface 322 and at least one processor 324. Server 304 can be or include, e.g., a bearer-management device 122 such as P-CSCF 220, or a policy-management device 126 such as PCRF 218. In some examples, the server 304 includes control unit(s) configured to perform operations described below, e.g., in response to computer program instructions of the bearer-management module 328.

At 1002, the control unit can receive, via a communications interface from a network terminal 102, a first request 1004 to create a first specialized bearer (SB) 1006. Examples are discussed herein, e.g., with reference to operation 402, first request 404, and first SB 406. The first request 1004 (e.g., a SIP INVITE) can indicate a user, e.g., by including identification information 1008 of the user. For example, identification information 1008 can be or include a value of a SIP From: or P-Asserted-Identity: header, a Gx User-CSG-Information AVP, a Gx User-Equipment-Info AVP, or a network address or address/port pair associated with the user. Examples are discussed herein, e.g., with reference to operation 416. In some examples, the control unit is a control unit of a P-CSCF 220 or an AS 228, and the identification information 1008 includes a SIP From: or P-Asserted-Identity: header or header value. In some examples, the control unit is a control unit of a PCRF 218, and the identification information 1008 includes a Gx AVP or value such as those listed earlier in this paragraph.

The first request 1004 can indicate a first media type 1010 different from an audio media type. For example, the first request 1004 can indicate the first media type 1010 as a value in a SIP Content-Type header, an SDP m=line, an Rx Media-Type AVP, a Gx Bearer-Usage AVP (e.g., value ≥2; cf. 3GPP 29.212 § 5.3.1), or a Gx Priority-Level AVP (e.g., the value being associated with low-latency data services). Examples are discussed herein, e.g., with reference to first mtype 414.

At 1012, the control unit can determine that the user is authorized to create the first SB, e.g., that the user's account carries authorization for creation of SBs on behalf of that account. Examples are discussed herein, e.g., with reference to operation 416.

At 1014, the control unit can send, in response, via the communications interface to a policy-management device, a first setup message 1016 requesting creation of the first SB 1006. The first setup message 1016 can include a first QoS indicator 1018 associated with the first media type 1010. Examples are discussed herein, e.g., with reference to operation 420, first setup message 422, and first QoS indicator 424.

FIG. 11 is a dataflow diagram illustrating an example process 1100 for bearer management and related data items. In some examples, control unit(s) of server(s) 304, e.g., a bearer-management device 122 or a policy-management device 126, perform operations described below, e.g., in response to computer program instructions of the bearer-management module 328. In some examples, operations of process 1100 can be performed after or at least partly in parallel with operations of process 1000. For example, operation 1104 can be performed after operation 1002 or 1014.

In some examples, first request 1004 identifies a channel 1102. Examples are discussed herein, e.g., with reference to first communication channel identification 408.

At 1104, the control unit can receive, from the communications interface from a network terminal, a second request 1106 to create a second specialized bearer (SB) 1108. The second request 1106 can identify the channel 1102. The second request 1106 can indicate a second user, e.g., by including identification information 1110. The second request 1106 can indicate a second media type 1112, which can be different from an audio media type and different from the first media type 1010. Examples are discussed herein, e.g., with reference to operation 430 and second mtype 442.

At 1114, the control unit can determine that the second user is authorized to create the second SB 1108. Examples are discussed herein, e.g., with reference to operations 444 and 1012.

At 1116, the control unit can send, via the communications interface to the policy-management device 126, a second setup message 1118 requesting creation of the second SB 1108. Operation 1116 can be performed in response to the determination at operation 1114. The second setup message 1118 can include a second QoS indicator 1120 associated with the second media type 1112.

Various examples of process 1100 provide multiple SBs for a particular session or channel. This can permit, e.g., different types of interactions between users or terminals 102 in a session to be carried using SBs having different QCIs. For example, a computer-mediated competition might involve the exchange of both state information requiring low latency and contextual information (such as virtual time of day) capable of tolerating higher latency Using multiple SBs in this and other examples can permit using network resources more effectively than schemes in which all traffic is given low-latency treatment, which can increase network robustness and capacity.

Figure 12:
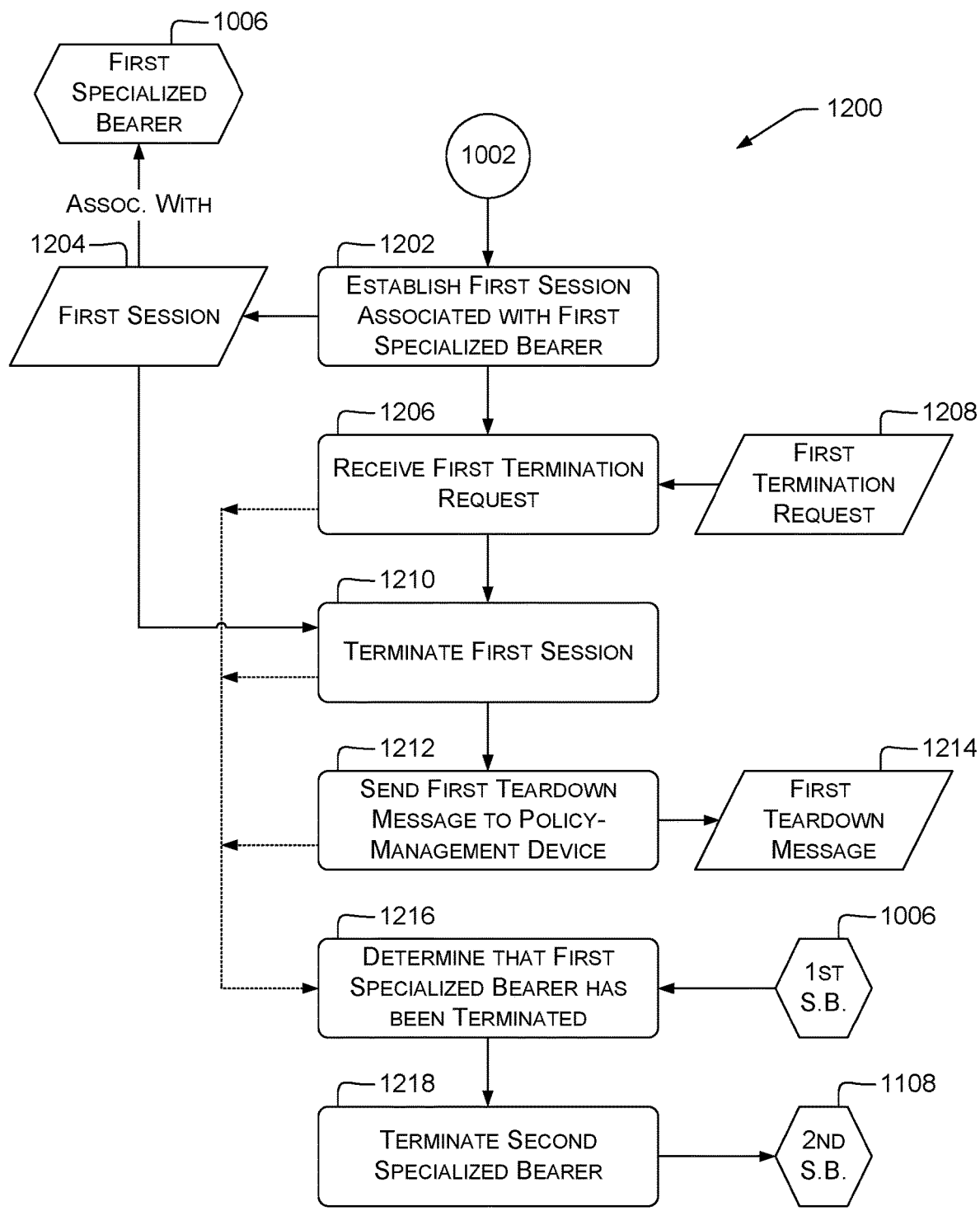
FIG. 12 illustrates an example process of managing a session associated with a specialized bearer.

FIG. 12 is a dataflow diagram illustrating an example process 1200 for bearer management or session management, e.g., creation or teardown of bearers or sessions, and related data items. In some examples, control unit(s) of server(s) 304, e.g., a P-CSCF 220 or other bearer-management device 122 or policy-management device 126, perform operations described below, e.g., in response to computer program instructions of the session-operations module 330 or the bearer-management module 328. In some examples, operations 1202-1218 are performed by session-operations module 330. Alternatively, operations 1202-1212 can be performed by session-operations module 330 and operations 1216-1218 by bearer-management module 328. Alternatively, operations 1202-1216 can be performed by session-operations module 330 and operation 1218 by bearer-management module 328. In some examples, operation 1002 can be followed by operation 1202.

At 1202, the control unit can establish, in response to the first request 1004, a first session 1204 associated with the first specialized bearer (SB) 1006. This can be done, e.g., using SIP procedures for establishment of dialogs in response to a SIP INVITE. The control unit can record information about the session in a memory.

At 1206, the control unit can receive, after sending the first setup message 1016, a first termination request 1208. For example, the first termination request 1208 can include a SIP BYE request. In response, the control unit can perform operations 1210 and 1212.

At 1210, the control unit can terminate the first session 1204. For example, the control unit can perform SIP dialog teardown procedures. The control unit can update or remove memory-stored information about the session.

At 1212, the control unit can send, via the communications interface to the policy-management device 126, a first teardown message 1214 requesting removal of the first SB 1006. The first teardown message 1214 can include, e.g., a Diameter CCR, ASR, or STR message (e.g., 29.213 v15.3.0 § 4.2).

In some examples, multiple bearers are used, e.g., as discussed herein with reference to FIG. 11. Some of these examples manage the multiple bearers as a group using operations 1216 and 1218. Operation 1206, 1210, or 1212 can be followed by operation 1216.

At 1216, the control unit can determine that the first SB 1006 has been terminated. In some examples, the control unit can receive a Diameter CCR or ASR associated with the first SB 1006, or another message indicating that first SB 1006 has been terminated.

At 1218, the control unit can terminate the second SB. Operation 1218 can be performed in response to the determination at operation 1216. Examples are discussed herein, e.g., with reference to operations 1210 and 1212.

In some examples, responding to SB termination by terminating other SBs, e.g., associated with the same session (e.g., first session 1204), can simulate a LAN failure in which all connectivity is lost. This can reduce the probability of data loss or corruption in an application due to successful transmission of only some types of data, and therefore improve networked-application robustness. In some examples, operations 1216 and 1218 can be performed at terminal 102 instead of or in addition to at server 304.

Figure 13:
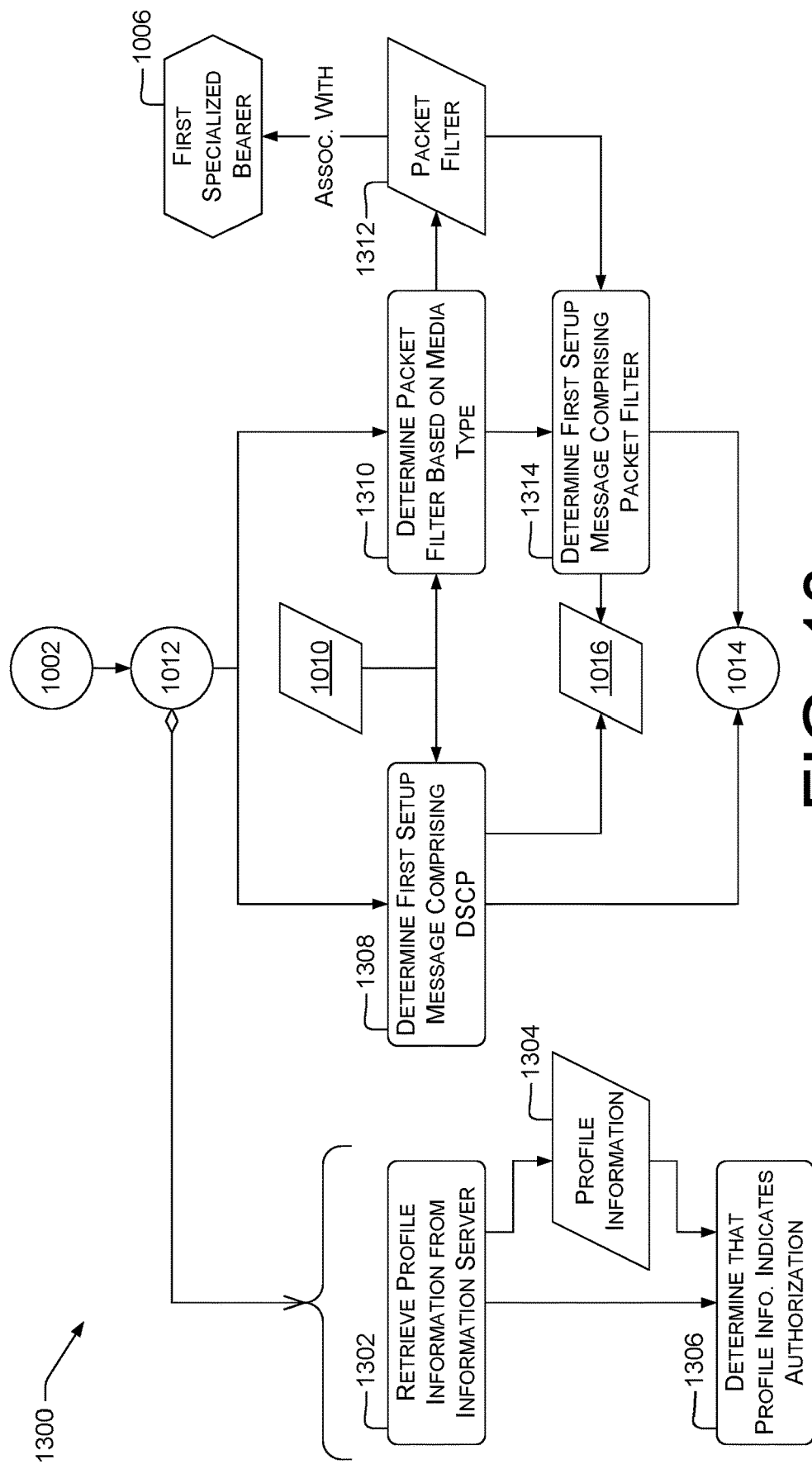
FIG. 13 illustrates example processes of authorizing users and determining setup messages.

FIG. 13 is a dataflow diagram illustrating example processes 1300 for bearer management and related data items. In some examples, control unit(s) of server(s) 304, e.g., a bearer-management device 122 or a policy-management device 126, perform operations described below, e.g., in response to computer program instructions of the bearer-management module 328 or the session-operations module 330. In some examples, operation 1012 can include operations 1302 and 1306. In some examples, operation 1012 can be followed by operation 1308 or operation 1310. In some examples, operation 1308 or 1314 can be followed by operation 1014. In some examples, operation 1014 can include operation 1308. In some examples, operation 1014 can include operations 1310 and 1314.

At 1302, the control unit can retrieve, from information server 124, profile information 1304 associated with the user indicated in first request 1004, e.g., identified by identification information 1008. Examples are discussed herein, e.g., with reference to operation 416. For example, profile information 1304 can include an AVP indicating authorization to create specialized bearers (SBs). Operation 1302 can include retrieving the profile information 1304 via Diameter or other protocols over the Sp reference point. For example, the control unit can send a Diameter UDR to information server 124, and receive a Diameter UDA including multiple AVPs.

At 1306, the control unit can determine that the profile information 1304 indicates that the user is authorized to create the first SB 1006. Examples are discussed herein, e.g., with reference to operation 416. For example, the control unit can determine that a predetermined AVP in profile information 1304 includes a value representing the authorization to create the first SB 1006.

In some examples of operations 1302 and 1306, the control unit is a control unit of PCRF 218. Some prior schemes do not retrieve and process user-specific authorization data as described above with reference to operations 1302 and 1306. See, e.g., 29.213 v15.3.0 Figure 4.1.1, NOTE 2. In other examples, the control unit is a control unit of P-CSCF 220 or AS 228.

At 1308, the control unit can determine the first setup message 1016 further comprising a differentiated services indicator, e.g., a DSCP, associated with the first media type 1010. Examples are discussed herein, e.g., with reference to operation 906 and differentiated-services indicator 910. This can permit the routing device 108 to correctly prioritize packets traveling on bearer 120.

At 1310, the control unit can determine a packet filter 1312, e.g., a traffic flow template (TFT), based at least in part on the first media type 1010. For example, the control unit can determine Flow-Description AVPs to provision to PCRF 218 via a Diameter connection over the Rx interface or to routing device 108 (e.g., a PGW) via a Diameter connection over the Gx interface. Operation 1310 can include determining the packet filter 1312 listing at least: a network address of the terminal 102; a network port (see, e.g., operation 1406, below); or identification information described herein with reference to channel 1102.

At 1314, the control unit can determine the first setup message 1016 comprising the packet filter 1312. The packet filter 1312 can be associated with the first SB 1006. For example, the first setup message 1016 can be a Diameter AAR including the AVP(s) of the packet filter 1312.

Figure 14:
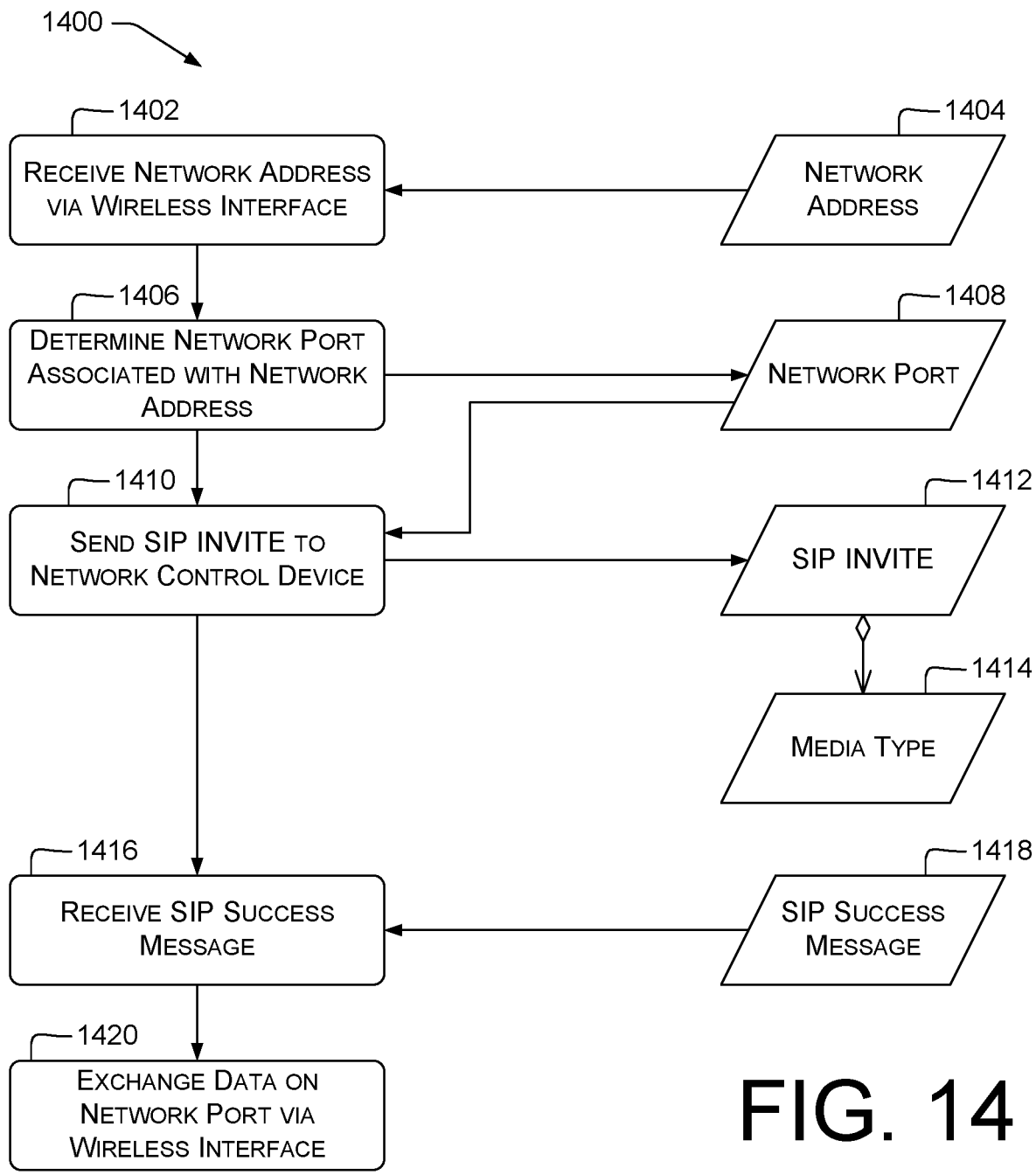
FIG. 14 illustrates an example process for communicating via a specialized bearer.

FIG. 14 is a dataflow diagram illustrating an example process 1400 for data transfer using specialized bearers (SBs), and related data items. In some examples, control unit(s) of terminals(s) 102, 202, 302, perform operations described below, e.g., in response to computer program instructions of the specialized application 318. In some examples, the control unit(s) include at least one processor 310. The control unit can communicate via a wireless communications interface 314.

At 1402, the control unit can receive a network address 1404 via the wireless communications interface. The network address 1404 can be associated with a particular APN, in some examples. For example, the control unit can receive the network address 1404 in an Attach Accept message from an MME upon initial attachment to an LTE network 306. Additionally or alternatively, the control unit can receive the network address 1404 in a Non-Access Stratum (NAS) Activate default EPS bearer context request message sent in response to a NAS PDN connectivity request.

At 1406, the control unit can determine a network port 1408 associated with the network address. For example, the control unit can select an unused network port, e.g., in the range 1024-65535. Operation 1406 can be performed by application-level or OS-level modules. For example, operation 1406 can be carried out by the OS as part of processing of a bind( ) call.

At 1410, the control unit can send a SIP INVITE message 1412 to a network control device. The SIP INVITE message 1412 can indicate the network port 1408 and a media type 1414. In some examples, the media type 1414 is not an audio media type, and the media type 1414 is not a video media type. The network port 1408 can be indicated on an m=line of an SDP body of the SIP INVITE message 1412.

At 1416, the control unit can receive a SIP success message 1418 in response to the SIP invite message. SIP success message 1418 can include, e.g., a SIP 2xx response.

At 1420, the control unit can exchange (e.g., transmit or receive) data on the network port 1408 with a peer network terminal (e.g., peer node 210) via the wireless communications interface. This can be done subsequent to receiving the SIP success message 1418. In some examples, the network port 1408 is indicated in a TFT or other packet filter 1312, FIG. 13. For example, the radio or related components of terminal 102 can assign data to be transmitted over the network port 1408 to a first SB 114, 1006 based on a match between network port 1408 and a port indicated in packet filter 1312. Some examples omit operation 1406 and instead extract the network port 1408 from the packet filter 1312 after receiving SIP success message 1418.

In some prior VoLTE schemes and some other prior RTP-based schemes, exactly one protocol is used on a particular network port. For example, a SIP INVITE including an SDP body includes m=and a=rtpmap lines specifying candidate protocols, and the SIP offer-answer model includes selecting exactly one of the offered candidates for a particular m=line. By contrast, in some examples, the exchanging data (operation 1420) includes multiplexing data in at least two protocols on the network port 1408. For example, operation 1420 can include multiplexing a media stream and a file-transfer stream. Multiplexing can be done using tunneling protocols such as IPsec, TLS, GTP, or Proxy Mobile IP (PMIP). Additionally or alternatively, multiplexing can be done using layer 5-7 tunneling protocols such as BEEP. This can permit virtual-LAN communications, e.g., by multiplexing traffic over multiple network ports on a virtual adapter over a single network port 1408, e.g., associated with an SB.

Some prior schemes, such as some VoLTE implementations, require that the SIP request URI or To: header identify the party with whom communications are to be carried out. Various examples herein permit more flexible traffic exchange. For example, terminals 102(1) and 102(N), FIG. 1, can be connected via SB 114, bearer 120, and SB 116 in a virtual-LAN configuration that routes communications between terminals 102(1) and 102(N) without requiring each terminal 102(1), 102(N) to identify the other. Similarly, some examples provide a virtual-LAN configuration involving more than two terminals. A SIP INVITE message 1412 for a channel is directed to the bearer-management device 122 or other network control device without requiring the addresses of other terminal(s) that may be participating in that channel. For example, the SIP INVITE message 1412 can list AS 228 (e.g., a computer-mediated-competition server) in the To: header and P-CSCF 220 in the start-line. However, data can be sent via the resulting SB to a terminal 102 that is neither the AS 228 nor the P-CSCF 220.

Accordingly, in some examples, the SIP INVITE message 1412 comprises a request URI indicating a first network entity, e.g., identified by name or URI. In some examples, SIP INVITE message 1412 includes a To-header value indicating a second network entity. In some examples, the peer network terminal is different from the first network entity, and the peer network terminal is different from the second network entity.

Figure 15:
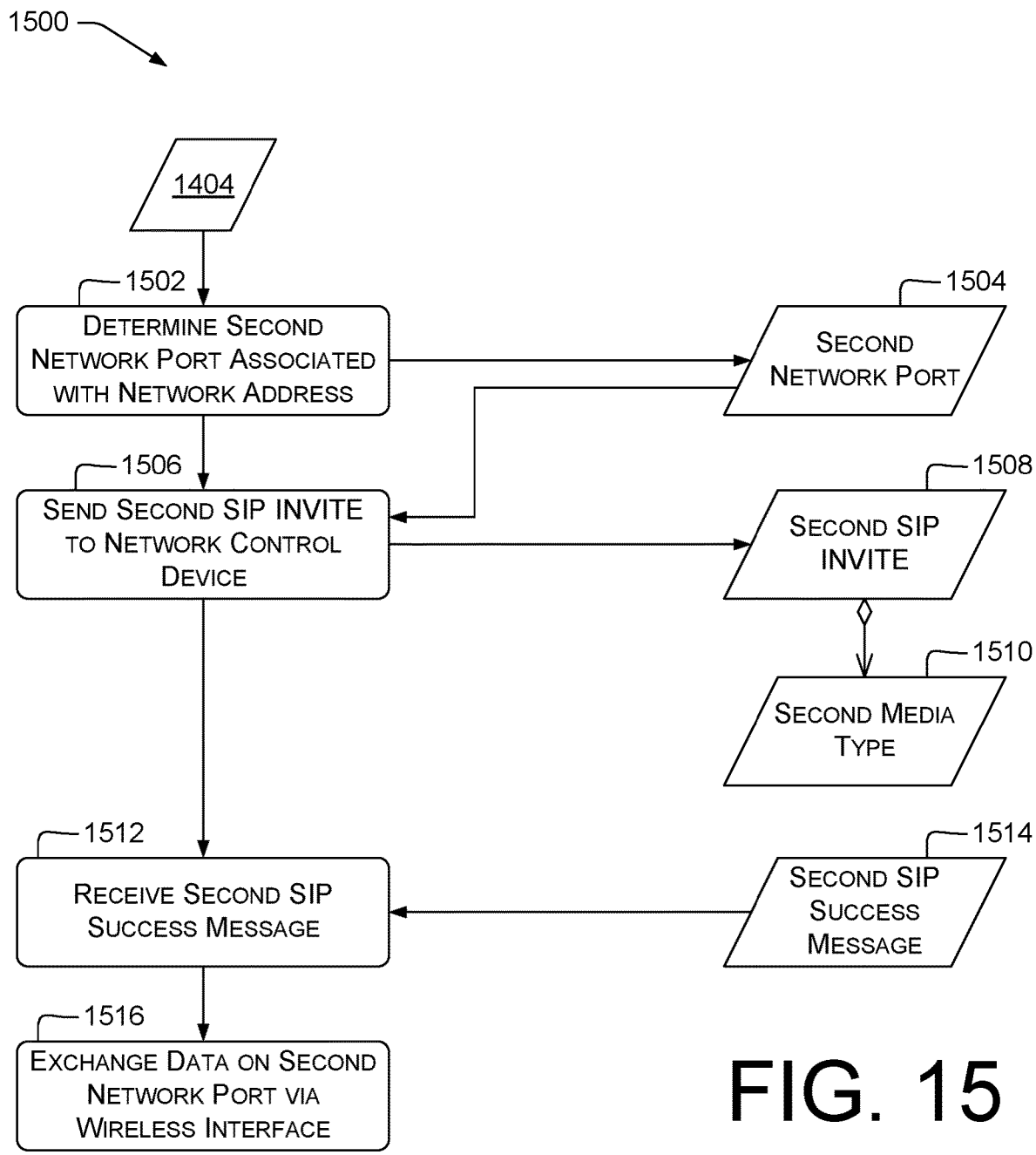
FIG. 15 illustrates an example process for communicating via a second specialized bearer.

FIG. 15 is a dataflow diagram illustrating an example process 1500 for bearer management and related data items. In some examples, control unit(s) of server(s) 304, e.g., a bearer-management device 122 or a policy-management device 126, perform operations described below, e.g., in response to computer program instructions of the specialized application 318. In some examples, operation 1502 is performed after operation 1402 or 1406. Various examples of FIG. 15 use multiple specialized bearers (SBs) for respective, different types of traffic, e.g., as discussed herein with reference to operation 1116.

At 1502, the control unit can determine a second network port 1504 associated with the network address 1404. Examples are discussed herein, e.g., with reference to operation 1406.

At 1506, the control unit can send a second SIP INVITE message 1508 to the network control device. Examples are discussed herein, e.g., with reference to operation 1410. In some examples, the second SIP INVITE message indicates the second network port 1504 and the second SIP INVITE message indicates a second media type 1510. In some examples, the second media type 1510 is not an audio media type, the second media type 1510 is not a video media type, and the second media type 1510 is different from the media type 1414.

At 1512, the control unit can receive a second SIP success message 1514 in response to the SIP INVITE message 1508. Examples are discussed herein, e.g., with reference to operation 1416.

At 1516, the control unit can exchange data on the second network port 1504 with the peer network terminal via the wireless communications interface. Examples are discussed herein, e.g., with reference to operation 1420. For example, the radio or related components of terminal 102 can assign data to be transmitted over the second network port 1504 to a second SB 1108 based on a match between second network port 1504 and a port indicated in packet filter 1312 or another packet filter.

Figure 16:
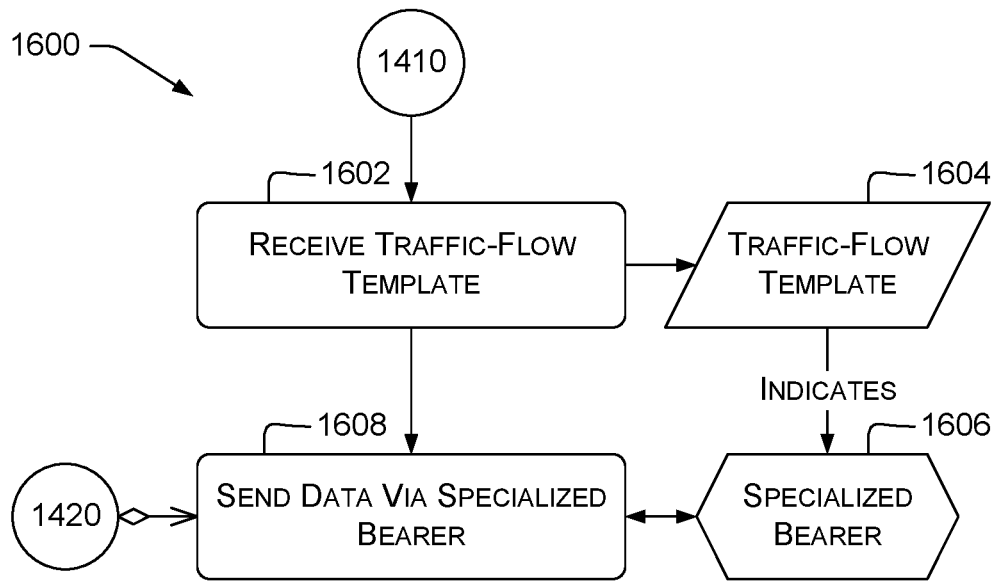
FIG. 16 illustrates an example process of sending data via a specialized bearer.

FIG. 16 is a dataflow diagram illustrating an example process 1600 for bearer management or data exchange, and related data items. In some examples, control unit(s) of terminals(s) 102 perform operations described below, e.g., in response to computer program instructions of the specialized application 318. In some examples, operation 1602 is performed after operation 1410. In some examples, operation 1420 includes operation 1608.

At 1602, the control unit can receive, after sending the SIP INVITE message 1412, a TFT 1604 from the network control device. The TFT 1604 can indicate a specialized bearer (SB) 1606 associated with the wireless communications interface. For example, the TFT 1604 can be or include a packet filter 1312.

At 1608, the control unit can send at least some of the data via the SB 1606 in response to the TFT 1604. For example, at layers below the IP layer (e.g., layers 1 or 2, or LTE PHY or MAC layers such as RRC or PDCP), data can be mapped onto the SB 1606 if that data or its transmission characteristics (e.g., layer 3 port) matches criteria in TFT 1604.

Figure 17:
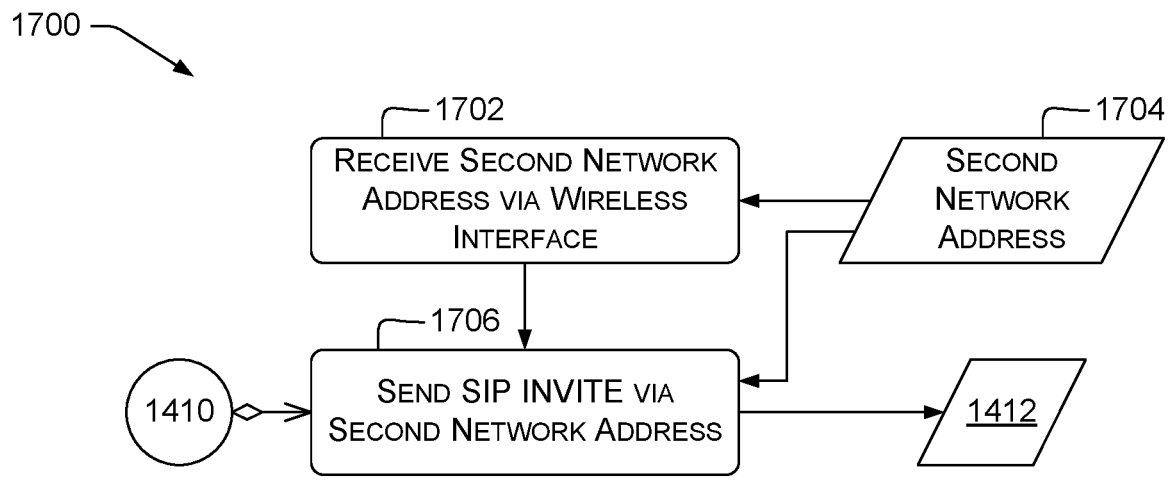
FIG. 17 illustrates an example process of requesting a specialized bearer.

FIG. 17 is a dataflow diagram illustrating an example process 1700 for bearer management and related data items. In some examples, control unit(s) of terminal(s) 102 perform operations described below, e.g., in response to computer program instructions of the specialized application 318. In some examples, operation 1410 can include operation 1706. In some examples, latency-sensitive traffic is carried on a different APN or network subset than the IMS APN. In some examples, operations 1402 and 1702 can be performed in either relative order At 1702, the control unit can receive a second network address 1704 via the wireless communications interface. Examples are discussed herein, e.g., with reference to 1402. The second network address 1704 can be different from the network address 1404.

At 1706, the control unit can send the SIP INVITE message 1412 via the second network address 1704. Examples are discussed herein, e.g., with reference to operation 1410.

In some examples, the second network address 1704 is associated with an IMS APN, e.g., the IMS well-known APN or another APN, and the network address 1404 is associated with a second APN different from the IMS APN. The second APN can be an APN for low-latency communications. This can permit separating signaling traffic from latency-sensitive data traffic, which can improve network management effectiveness. Moreover, in some examples, the packet filter 1312 or TFT 1604 for the second APN passes all traffic on network address 1404. This can permit virtual-LAN communications, in which terminal 102 can use any IP port on network address 1404 for latency-sensitive communications. This can increase network flexibility and resource utilization at the terminal 102.

EXAMPLE CLAUSES

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A system for telecommunication, the system comprising: one or more routing devices; a bearer-management device comprising a communications interface; and a policy-management device; wherein the bearer-management device is configured to perform first operations comprising: receiving, from a first network terminal via a communications interface, a first request to create a first specialized bearer, the first request identifying a first communication channel; making a first determination that the first request indicates a first predetermined media type, wherein: the first predetermined media type is not an audio media type; and the first predetermined media type is not a video media type; making a second determination that the first request is associated with a first authorized user; sending, via the communications interface to a policy-management device in response to the first determination and to the second determination, a first setup message, wherein: the first setup message requests establishment of the first specialized bearer; and the first setup message comprises a first Quality of Service (QoS) indicator; sending, to the first network terminal, a first completion message indicating establishment of the first specialized bearer; receiving, from a second network terminal via the communications interface, a second request to create a second specialized bearer, the second request identifying a second communication channel; making a third determination that the second request indicates a second predetermined media type, wherein: the second predetermined media type is not an audio media type; and the second predetermined media type is not a video media type; making a fourth determination that the second request is associated with a second authorized user; sending, via the communications interface to the policy-management device in response to the third determination and to the fourth determination, a second setup message, wherein: the second setup message requests establishment of the second specialized bearer; and the second setup message comprises a second QoS indicator; sending, to the second network terminal, a second completion message indicating establishment of the second specialized bearer; wherein the policy-management device is configured to perform second operations comprising: creating the first specialized bearer having first QoS characteristics in response to the first setup message, wherein: the first specialized bearer permits exchange of first data between the first network terminal and at least one of the one or more routing devices; and the first QoS characteristics are associated with the first QoS indicator; creating the second specialized bearer having second QoS characteristics in response to the second setup message, wherein: the second specialized bearer permits exchange of second data between the second network terminal and at least one of the one or more routing devices; and the second QoS characteristics are associated with the second QoS indicator; and wherein the one or more routing devices are configured to convey traffic between the first specialized bearer and the second specialized bearer.

B: The system according to paragraph A, wherein: the first specialized bearer is not a voice-over-long-term-evolution (VoLTE) bearer; and the first specialized bearer is not a video-over-long-term-evolution (ViLTE) bearer, C: The system according to paragraph A or B, wherein: the first operations further comprise: receiving, from a third network terminal via the communications interface, a third request to create a third specialized bearer, the third request identifying at least the first communication channel or the second communication channel; making a fifth determination that the third request indicates a third predetermined media type, wherein: the third predetermined media type is not an audio media type; and the third predetermined media type is not a video media type; making a sixth determination that the third request is associated with a third authorized user; sending, via the communications interface to the policy-management device in response to the fifth determination and to the sixth determination, a third setup message, wherein: the third setup message requests establishment of the third specialized bearer; and the third setup message comprises a third QoS indicator; sending, to the third network terminal, a third completion message indicating establishment of the third specialized bearer; the second operations further comprise: creating the third specialized bearer having third QoS characteristics in response to the third setup message, wherein: the third specialized bearer permits exchange of third data between the third network terminal and at least one of the one or more routing devices; and the third QoS characteristics are associated with the third QoS indicator; and the one or more routing devices are further configured to: receive a packet via the first specialized bearer; forward the packet to the second specialized bearer; and forward the packet to the third specialized bearer.

D: The system according to any of paragraphs A-C, wherein the second request identifies the first network terminal.

E: The system according to any of paragraphs A-D, wherein: the one or more routing devices comprise a first routing device and a second, different routing device; the first routing device is configured to: receive a first packet from the first network terminal; determine a second packet based at least in part on the first packet, the second packet comprising a differentiated-services indicator associated with the first QoS characteristics; and send the second packet to the second routing device; and the second routing device is configured to: receive the second packet; determine a third packet based at least in part on the second packet; and send the third packet to the second network terminal.

F: The system according to any of paragraphs A-E, the first operations comprising making the second determination at least partly by retrieving, from an information server, authorization information associated with user information included in the first request.

G: The system according to any of claims A-F, wherein the first communication channel is communicatively connected with the second communication channel.

H: The system according to any of claims A-G, wherein the identification (408) is not an identifier of a party reachable via VoLTE or ViLTE from the server (304).

I: The system according to any of claims A-H, wherein the identification (408) is not an identifier of a party reachable via VoLTE or ViLTE from the first network terminal (102, 202, 302).

J: The system according to any of paragraphs A-I, wherein: at least one of the one or more routing devices comprises a Long-Term Evolution (LTE) packet data network gateway (PGW); the policy-management device comprises at least an LTE policy charging and rules function (PCRF); and the bearer-management device comprises at least an LTE proxy call session control function (P-CSCF), Application Server (AS), or PCRF.

K: The system according to any of paragraphs A-J, wherein the first specialized bearer comprises an LTE data radio bearer (DRB).

L: A method comprising, by a network control device: receiving, via a communications interface from a network terminal, a first request to create a first specialized bearer, wherein the first request indicates a user and indicates a first media type different from an audio media type; determining that the user is authorized to create the first specialized bearer; and in response, sending, via the communications interface to a policy-management device, a first setup message requesting creation of the first specialized bearer, the first setup message comprising a first Quality of Service (QoS) indicator associated with the first media type.

M: The method according to paragraph L, wherein: the first request identifies a channel; and the method further comprises, by the network control device: receiving, from the communications interface from a network terminal, a second request to create a second specialized bearer, wherein: the second request identifies the channel; the second request indicates a second user; the second request indicates a second media type; the second media type is different from an audio media type; and the second media type is different from the first media type; determining that the second user is authorized to create the second specialized bearer; and in response, sending, via the communications interface to the policy-management device, a second setup message requesting creation of the second specialized bearer, the second setup message comprising a second QoS indicator associated with the second media type.

N: The system according to paragraph M, further comprising, by the network control device: determining that the first specialized bearer has been terminated; and in response, terminating the second specialized bearer.

O: The method according to any of paragraphs L-N, further comprising, by the network control device: in response to the first request, establishing a first session associated with the first specialized bearer; after sending the first setup message, receiving a first termination request; and in response: terminating the first session; and sending, via the communications interface to the policy-management device, a first teardown message requesting removal of the first specialized bearer.

P: The method according to any of paragraphs L-O, further comprising, by the network control device: determining a packet filter based at least in part on the first media type; and determining the first setup message comprising the packet filter, wherein the packet filter is associated with the first specialized bearer.

Q: The method according to any of paragraphs L-P, further comprising, by the network control device, determining the first setup message further comprising a differentiated services indicator associated with the first media type.

R: The method according to any of paragraphs L-Q, wherein: the network control device is a policy control rules function (PCRF) node; and the method comprises, by the network control device: retrieving, from an information server, profile information associated with the user; and determining that the profile information indicates that the user is authorized to create the first specialized bearer.

S: A network terminal, comprising: a wireless communications interface; at least one processor; and at least one computer-readable medium storing instructions executable by the at least one processor to cause the at least one processor to perform operations comprising: receiving a network address via the wireless communications interface; determining a network port associated with the network address; sending a Session Initiation Protocol (SIP) INVITE message to a network control device, wherein: the SIP INVITE message indicates the network port; the SIP INVITE message indicates a media type; the media type is not an audio media type; and the media type is not a video media type; receiving a SIP success message in response to the SIP invite message; and subsequently, exchanging data on the network port with a peer network terminal via the wireless communications interface.

T: The network terminal according to paragraph S, wherein: the SIP INVITE message comprises: a request Uniform Resource Identifier (URI) indicating a first network entity; and a To-header value indicating a second network entity; the peer network terminal is different from the first network entity; and the peer network terminal is different from the second network entity.

U: The network terminal according to paragraph S or T, the operations further comprising: determining a second network port associated with the network address; sending a second Session Initiation Protocol (SIP) INVITE message to the network control device, wherein: the second SIP INVITE message indicates the second network port; the second SIP INVITE message indicates a second media type; the second media type is not an audio media type; the second media type is not a video media type; and the second media type is different from the media type; receiving a second SIP success message in response to the SIP INVITE message; and subsequently, exchanging data on the second network port with the peer network terminal via the wireless communications interface.

V: The network terminal according to any of paragraphs S-U, the operations further comprising: receiving, after sending the SIP INVITE message, a traffic-flow template (TFT) from the network control device, the TFT indicating a specialized bearer associated with the wireless communications interface; and sending at least some of the data via the specialized bearer in response to the TFT.

W: The network terminal according to any of paragraphs S-V, the operations further comprising: receiving a second network address via the wireless communications interface, wherein the second network address is different from the network address; and sending the SIP INVITE via the second network address.

X: The network terminal according to paragraph W, wherein: the second network address is associated with an Internet Protocol (IP) Multimedia Subsystem (IMS) Access Point Name (APN); and the network address is associated with a second APN different from the IMS APN.

Y: The network terminal according to any of paragraphs S-X, wherein the exchanging data comprises multiplexing data in at least two protocols on the network port.

Z: The system according to any of paragraphs A-K, component(s) of the system further configured to perform the functions recited in any of paragraphs L-R.

AB: The subject matter of any of paragraphs A-K, L-R, or S-Y, wherein the specialized bearer(s) are assigned to QCI(s) between one and four, or to QCIs having priority levels within the range of priority levels spanned by QCIs one through four.

AC: A device comprising: a processor; and a computer-readable medium, e.g., a computer storage medium, having thereon computer-executable instructions, the computer-executable instructions upon execution by the processor configuring the device to perform operations as any of paragraphs A-K, L-R, or S-Y recites.

AD: A computer-readable medium, e.g., a computer storage medium, having thereon computer-executable instructions, the computer-executable instructions upon execution configuring a computer to perform operations as any of paragraphs A-K, L-R, or S-Y recites.

AE: A device comprising: a processor; and a computer-readable medium, e.g., a computer storage medium, having thereon computer-executable instructions, the computer-executable instructions upon execution by the processor configuring the device to perform operations as any of paragraphs A-K, L-R, or S-Y recites.

AF: A system comprising: means for processing; and means for storing having thereon computer-executable instructions, the computer-executable instructions including means to configure the system to carry out a method as any of paragraphs A-K, L-R, or S-Y recites.

AG: A network control device configured to perform operations as any of paragraphs A-K, L-R, or S-Y recites.

AH: A method comprising performing operations as any of paragraphs A-K, L-R, or S-Y recites.

CONCLUSION

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A network terminal, comprising:
a wireless communications interface;
at least one processor; and
at least one computer-readable medium storing instructions executable by the at least one processor to cause the at least one processor to perform operations comprising:
receiving a network address via the wireless communications interface;
determining a network port associated with the network address;
sending a Session Initiation Protocol (SIP) INVITE message to a network control device, wherein:
the SIP INVITE message indicates the network port;
the SIP INVITE message indicates a media type;
the media type is not an audio media type;
the media type is not a video media type;
the SIP INVITE message comprises a request Uniform Resource Identifier (URI) indicating a first network entity; and
the SIP INVITE message comprises a To-header value indicating a second network entity;
receiving a SIP success message in response to the SIP invite message; and
subsequently, exchanging data on the network port with a peer network terminal via the wireless communications interface, wherein the peer network terminal is different from the first network entity and the second network entity.

2. The network terminal according to claim 1, the operations further comprising:
determining a second network port associated with the network address;
sending a second Session Initiation Protocol (SIP) INVITE message to the network control device, wherein:
the second SIP INVITE message indicates the second network port;
the second SIP INVITE message indicates a second media type;
the second media type is not an audio media type;
the second media type is not a video media type; and
the second media type is different from the media type;
receiving a second SIP success message in response to the SIP INVITE message; and
subsequently, exchanging data on the second network port with the peer network terminal via the wireless communications interface.

3. The network terminal according to claim 1, the operations further comprising:
receiving, after sending the SIP INVITE message, a traffic-flow template (TFT) from the network control device, the TFT indicating a specialized bearer associated with the wireless communications interface; and
sending at least some of the data via the specialized bearer in response to the TFT.

4. The network terminal according to claim 1, the operations further comprising:
receiving a second network address via the wireless communications interface, wherein the second network address is different from the network address; and
sending the SIP INVITE message via the second network address.

5. The network terminal according to claim 4, wherein:
the second network address is associated with an Internet Protocol (IP) Multimedia Subsystem (IMS) Access Point Name (APN); and
the network address is associated with a second APN different from the IMS APN.

6. The network terminal according to claim 1, wherein the exchanging data comprises multiplexing data in at least two protocols on the network port.

7. A method comprising, by a network terminal:
receiving a network address via a wireless communications interface;
determining a network port associated with the network address;
sending a Session Initiation Protocol (SIP) INVITE message to a network control device, wherein:
the SIP INVITE message indicates the network port;
the SIP INVITE message indicates a media type;
the media type is not an audio media type; and
the media type is not a video media type;
receiving a SIP success message in response to the SIP invite message; and
subsequently, exchanging data on the network port with a peer network terminal via the wireless communications interface, wherein exchanging data comprises multiplexing data in at least two protocols on the network port, the two protocols including at least a media stream and a file-transfer stream.

8. The method according to claim 7, wherein:
the SIP INVITE message comprises:
a request Uniform Resource Identifier (URI) indicating a first network entity; and
a To-header value indicating a second network entity;
the peer network terminal is different from the first network entity; and
the peer network terminal is different from the second network entity.

9. The method according to claim 7, further comprising:
determining a second network port associated with the network address;

sending a second Session Initiation Protocol (SIP) INVITE message to the network control device, wherein:
the second SIP INVITE message indicates the second network port;
the second SIP INVITE message indicates a second media type;
the second media type is not an audio media type;
the second media type is not a video media type; and
the second media type is different from the media type;
receiving a second SIP success message in response to the SIP INVITE message; and
subsequently, exchanging data on the second network port with the peer network terminal via the wireless communications interface.

10. The method according to claim 7, further comprising:
receiving, after sending the SIP INVITE message, a traffic-flow template (TFT) from the network control device, the TFT indicating a specialized bearer associated with the wireless communications interface; and
sending at least some of the data via the specialized bearer in response to the TFT.

11. The method according to claim 7, further comprising:
receiving a second network address via the wireless communications interface, wherein the second network address is different from the network address; and
sending the SIP INVITE message via the second network address.

12. The method according to claim 11, wherein:
the second network address is associated with an Internet Protocol (IP) Multimedia Subsystem (IMS) Access Point Name (APN); and
the network address is associated with a second APN different from the IMS APN.

13. A non-transitory storage medium having programming instructions stored thereon which, when executed by a network terminal, cause the network terminal to perform operations comprising:
receiving a network address via a wireless communications interface;
determining a network port associated with the network address;
sending a Session Initiation Protocol (SIP) INVITE message to a network control device, wherein:
the SIP INVITE message indicates the network port;
the SIP INVITE message indicates a media type;
the media type is not an audio media type; and
the media type is not a video media type;
receiving a SIP success message in response to the SIP invite message; and
subsequently, exchanging data on the network port with a peer network terminal via the wireless communications interface, wherein exchanging data comprises multiplexing data in at least two protocols on the network port, the two protocols including at least a media stream and a file-transfer stream.

14. The non-transitory storage medium according to claim 13, wherein:
the SIP INVITE message comprises:
a request Uniform Resource Identifier (URI) indicating a first network entity; and
a To-header value indicating a second network entity;
the peer network terminal is different from the first network entity; and
the peer network terminal is different from the second network entity.

15. The non-transitory storage medium according to claim 13, the operations further comprising:
determining a second network port associated with the network address;
sending a second Session Initiation Protocol (SIP) INVITE message to the network control device, wherein:
the second SIP INVITE message indicates the second network port;
the second SIP INVITE message indicates a second media type;
the second media type is not an audio media type;
the second media type is not a video media type; and
the second media type is different from the media type;
receiving a second SIP success message in response to the SIP INVITE message; and
subsequently, exchanging data on the second network port with the peer network terminal via the wireless communications interface.

16. The non-transitory storage medium according to claim 13, the operations further comprising:
receiving, after sending the SIP INVITE message, a traffic-flow template (TFT) from the network control device, the TFT indicating a specialized bearer associated with the wireless communications interface; and
sending at least some of the data via the specialized bearer in response to the TFT.

17. The non-transitory storage medium according to claim 16, the operations further comprising:
receiving a second network address via the wireless communications interface, wherein the second network address is different from the network address; and
sending the SIP INVITE message via the second network address.

18. The non-transitory storage medium according to claim 17, wherein:
the second network address is associated with an Internet Protocol (IP) Multimedia Subsystem (IMS) Access Point Name (APN); and
the network address is associated with a second APN different from the IMS APN.

19. The non-transitory storage medium according to claim 13, wherein multiplexing data includes one or more tunneling protocols including at least one of IPsec, TLS, GTP, or Proxy Mobile IP (PMIP).

20. The non-transitory storage medium according to claim 13, wherein multiplexing data includes at least one tunneling protocol including at least a block extensible exchange protocol (BEEP).

* * * * *